(12) United States Patent
Balercia et al.

(10) Patent No.: US 9,980,200 B2
(45) Date of Patent: May 22, 2018

(54) RESOURCE ALLOCATION IN A MOBILE COMMUNICATION SYSTEM

(71) Applicant: INTEL DEUTSCHLAND GMBH, Neubiberg (DE)

(72) Inventors: Tommaso Balercia, Aalborg (DK); Markus Dominik Mueck, Neubiberg (DE)

(73) Assignee: INTEL DEUTSCHLAND GMBH, Neubiberg (DE)

(*) Notice: Subject to any disclaimer, the term of this patent is extended or adjusted under 35 U.S.C. 154(b) by 70 days.

(21) Appl. No.: 14/943,855

(22) Filed: Nov. 17, 2015

(65) Prior Publication Data

US 2016/0073320 A1 Mar. 10, 2016

Related U.S. Application Data

(62) Division of application No. 13/820,157, filed as application No. PCT/EP2011/064978 on Aug. 31, 2011, now Pat. No. 9,247,479.

(Continued)

(51) Int. Cl.
*H04W 40/22* (2009.01)
*H04B 7/155* (2006.01)
(Continued)

(52) U.S. Cl.
CPC ........ *H04W 40/22* (2013.01); *H04B 7/15557* (2013.01); *H04L 5/0037* (2013.01);
(Continued)

(58) Field of Classification Search
None
See application file for complete search history.

(56) References Cited

U.S. PATENT DOCUMENTS 5,883,884 A 3/1999 Atkinson
6,278,881 B1 * 8/2001 Balck .................. H04W 36/04
455/436

(Continued)

FOREIGN PATENT DOCUMENTS

CN 101521538 A 9/2009
CN 101605355 A 12/2009
(Continued)

OTHER PUBLICATIONS

Chinese Patent Office; First Office Action dated Oct. 9, 2015 for Chinese App. No. 201180052872.7; 20 pages.
(Continued)

*Primary Examiner* — Alex Skripnikov
(74) *Attorney, Agent, or Firm* — Schwabe, Williamson & Wyatt, P.C.

(57) ABSTRACT

In one embodiment, a mobile communication system is provided comprising a base station, a relay station, and a mobile station, a determiner configured to determine the distance between the mobile station and the base station or between the mobile station and the relay station, a decider configured to decide whether data transmission between the base station and the mobile station is carried out in a first relaying mode or a second relaying mode based on the determined distance and a controller configured to control the mobile communication system based on the result of the decision by the decider.

20 Claims, 28 Drawing Sheets

Related U.S. Application Data

(60) Provisional application No. 61/379,424, filed on Sep. 2, 2010.

(51) Int. Cl.

| | | |
|---|---|---|
| *H04W 40/20* | (2009.01) | |
| *H04B 7/26* | (2006.01) | |
| *H04L 5/00* | (2006.01) | |
| *H04W 72/04* | (2009.01) | |
| *H04W 84/04* | (2009.01) | |

(52) U.S. Cl.
CPC ........... *H04W 40/20* (2013.01); *H04B 7/2606* (2013.01); *H04L 5/0007* (2013.01); *H04W 72/04* (2013.01); *H04W 84/047* (2013.01)

(56) References Cited

U.S. PATENT DOCUMENTS

| | | | |
|---|---|---|---|
| 6,501,785 | B1 | 12/2002 | Chang et al. |
| 8,320,827 | B2* | 11/2012 | Adjakple ............... H04B 7/155 455/7 |
| 2006/0141929 | A1 | 6/2006 | Lockie |
| 2007/0178243 | A1 | 8/2007 | Wang et al. |
| 2008/0205323 | A1* | 8/2008 | Kaneko .............. H04B 7/15542 370/315 |
| 2009/0129336 | A1* | 5/2009 | Osborn ............... H04W 76/022 370/331 |
| 2009/0207761 | A1* | 8/2009 | Tangemann ........... H04B 7/155 370/281 |
| 2009/0279461 | A1 | 11/2009 | Rao et al. |
| 2010/0004001 | A1 | 1/2010 | Tao et al. |
| 2010/0039991 | A1 | 2/2010 | Godin et al. |
| 2011/0188398 | A1 | 8/2011 | Baba |
| 2011/0216676 | A1 | 9/2011 | Li et al. |
| 2012/0182898 | A1 | 7/2012 | Mao |

FOREIGN PATENT DOCUMENTS

| | | |
|---|---|---|
| CN | 101657012 A | 2/2010 |
| CN | 101668324 A | 3/2010 |
| EP | 1773091 A2 | 4/2007 |
| EP | 2173117 A1 | 4/2010 |
| EP | 2180741 A1 | 4/2010 |
| WO | 2007136220 A1 | 11/2007 |
| WO | 2009084760 A1 | 7/2009 |
| WO | 2009102906 A1 | 8/2009 |
| WO | 2010010402 A1 | 1/2010 |
| WO | 2010017628 A1 | 2/2010 |
| WO | 2010025658 A1 | 3/2010 |
| WO | 2010027821 A2 | 3/2010 |
| WO | 2010031439 A1 | 3/2010 |
| WO | 2010051780 A1 | 5/2010 |
| WO | 2010076773 A2 | 7/2010 |
| WO | 2010087687 A2 | 8/2010 |

OTHER PUBLICATIONS

International Search Report received for PCT/EP2011/064978, dated Dec. 27, 2011, 5 pages.
Y. Song et al., Relay station shared by multiple base stations for inter-cell interference mitigation, IEEE C802.16m-08/1436r1, Nov. 2008,4 pages.
Peters et al., Relay Architectures for 3GPP LTE-Advanced, EURASIP Journal on Wireless Communications and Networking, Jul. 13, 2009, 14 pages, vol. 2009, Article ID 618787.
Parkvall et al., LTE-Advanced—Evolving LTE towards IMT-Advanced, in Vehicular Technology Conference, 2008, pp. 1-5, VTC 2008-Fall, IEEE 68th, 21-24 2008.
E. Bjornson et al., Cooperative Multicell Precoding: Rate Region Characterization and Distributed Strategies With Instantaneous and Statistical CSI, Signal Processing, IEEE Transactions on, Aug. 2010, pp. 4298-4310, vol. 58, No. 8.
S. Katti et al., Embracing Wireless Interference: Analog Network Coding, in SIGCOMM '07: Proceedings of the 2007 conference on Applications, technologies, architectures, and protocols for computer communications, 2007, pp. 397-408, New York, NY, USA: ACM.
J. K. Sang et al., Comparison of bi-directional relaying protocols, in Sarnoff Symposium, 2008, pp. 1-5, IEEE 2008.
M. Costa, Writing on Dirty Paper (Corresp.), Information Theory, IEEE Transactions on, May 1983, pp. 439-441, vol. 29, No. 3.
3GPP TR 36.814 V2.0.0, 3rd Generation Partnership Project; Technical Specification Group Radio Access Network; Further Advancements for E-UTRA Physical Layer Aspects (Release 9), Mar. 2010, 103 pages.
3GPP TR 25.996 V9.0.0, 3rd Generation Partnership Project; Technical Specification Group Radio Access Network; Spatial channel model for Multiple Input Multiple Output (MIMO) simulations (Release 9), Dec. 2009, 40 pages.
English abstract of CN101605355A; Dec. 16, 2009.
English abstract of CN101521538A; Sep. 2, 2009.
Written Opinion received for PCT Patent Application No. PCT/EP2011/064978, dated Dec. 27, 2011, 15 pages.
International Preliminary Report on Patentability received for PCT Patent Application No. PCT/EP2011/064978, dated Mar. 5, 2013, 16 pages.
Chinese Patent Office; First Office Action for Chinese App. No. 201180052872.7 dated Oct. 9, 2015; pages inclusive of English translation (Not Yet Received).

* cited by examiner

RESOURCE ALLOCATION IN A MOBILE COMMUNICATION SYSTEM

CROSS-REFERENCE TO RELATED APPLICATIONS

This application is a divisional application of U.S. patent application Ser. No. 13/820,157 filed May 14, 2013, which is a national stage entry according to 35 U.S.C. § 371 of PCT Application No. PCT/EP2011/064978 filed Aug. 31, 2011, which claims benefit of U.S. Provisional Application No. 61/379,424 filed Sep. 2, 2010, all of which are hereby incorporated by reference in their entirety.

TECHNICAL FIELD

Embodiments generally relate to a mobile communication system, a method for data transmission, a relay station, a method for communication resource allocation, a base station, a mobile communication network, a method for relaying data, a method for receiving data, a network component, a network selection device and a method for selecting a communication network.

BACKGROUND

In radio communication systems, relay nodes can be used to allow a more efficient data transmission between base stations and communication terminals. Efficient usage of such relay nodes is desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Figure 1:
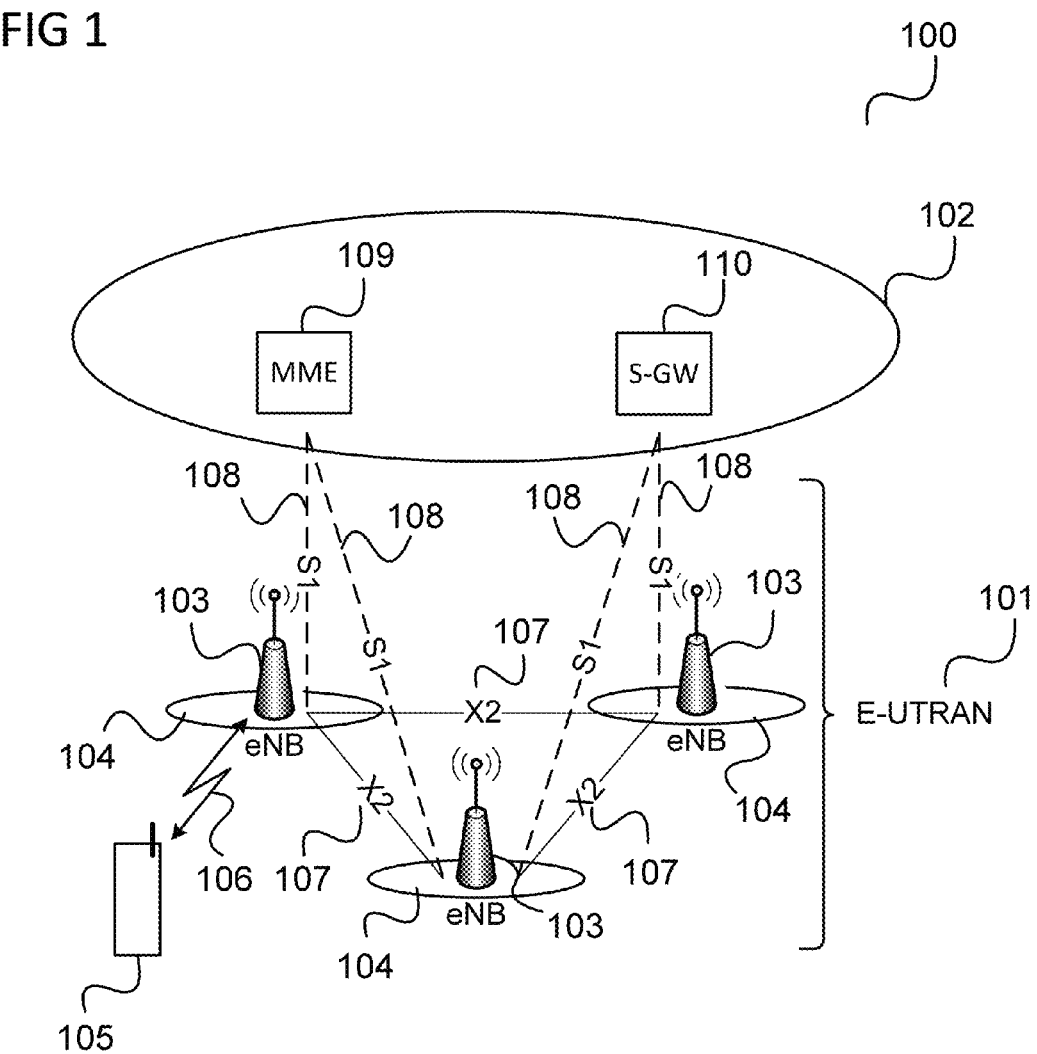
FIG. 1 shows a communication system according to an embodiment.

FIG. 1 shows a communication system 100 according to an embodiment.

The communication system 100 is a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution)) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101. Each radio cell 104 may be divided into a plurality of sectors (not shown) that may be operated independently from each other (i.e. e.g. using different communication resources such as different frequency ranges etc.).

A mobile terminal (also referred to as UE, user equipment) 105 located in a mobile radio cell 104 may communicate with the core network 102 and with other mobile terminals 105 via the base station providing coverage in (in other words operating) the mobile radio cell.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109 via a S1-MME interface and to a Serving Gateway (S-GW) 110 by means of an S1-U interface. The S1 interface supports a many-to-many relation between MMEs/S-GWs 109, 110 and the base stations 103, i.e. a base station 103 can be connected to more than one MME/S-GW 109, 110 and an MME/S-GW can 109, 110 be connected to more than one base station 103.

For example, the MME 109 may be responsible for controlling the mobility of mobile terminals located in the coverage area of E-UTRAN, while the S-GW 110 is responsible for handling the transmission of user data between mobile terminals 105 and core network 102.

Inter-channel interference (ICI) can be seen to be predominant in limiting the performance of wireless networks such as the communication system 100. Among the schemes that were proposed to alleviate its effects, a powerful class of techniques based on multi-point transmission is known under the name of cooperative multi-cell precoding, coordinated multipoint (CoMP) or base station cooperation (BSC). Parallel to these, variants of relaying that contain interference mitigation techniques have also been proposed. These variants can be categorized in two main classes: those that use network coding and those that are based on the deployment of shared relay nodes.

The concept of relaying can be expected to be part of communication systems according to 3GPP LTE-Advanced and may be based on fixed relaying nodes (i.e. stationary relaying nodes) and/or mobile relaying nodes. In the embodiments described in the following, a relaying node may be understood as a stationary relaying node. However, mobile relaying nodes may also be used according to various embodiments.

A standard relay scenario for a communication system according to 3GPP LTE-Advanced such as shown in FIG. 1 may consist in deploying a variable number of relay nodes inside each radio cell 104, with a minimum of one relay node per sector of each radio cell 104. Since each of such deployed relay nodes is thus associated only with one donor eNB 103 (namely the one operating the sector in which it is placed), it is referred here to such scheme as (1,n)-relaying, n being the number of relay nodes per eNB 103 (i.e. associated with the same eNB 103). As can be shown, the effectiveness of a network based on relays is best when using (m,n)-relaying. Such a scheme comprises the association of each relay node not to one single eNB 103, but to m eNBs 103. This concept is illustrated in FIG. 2.

Figure 2:
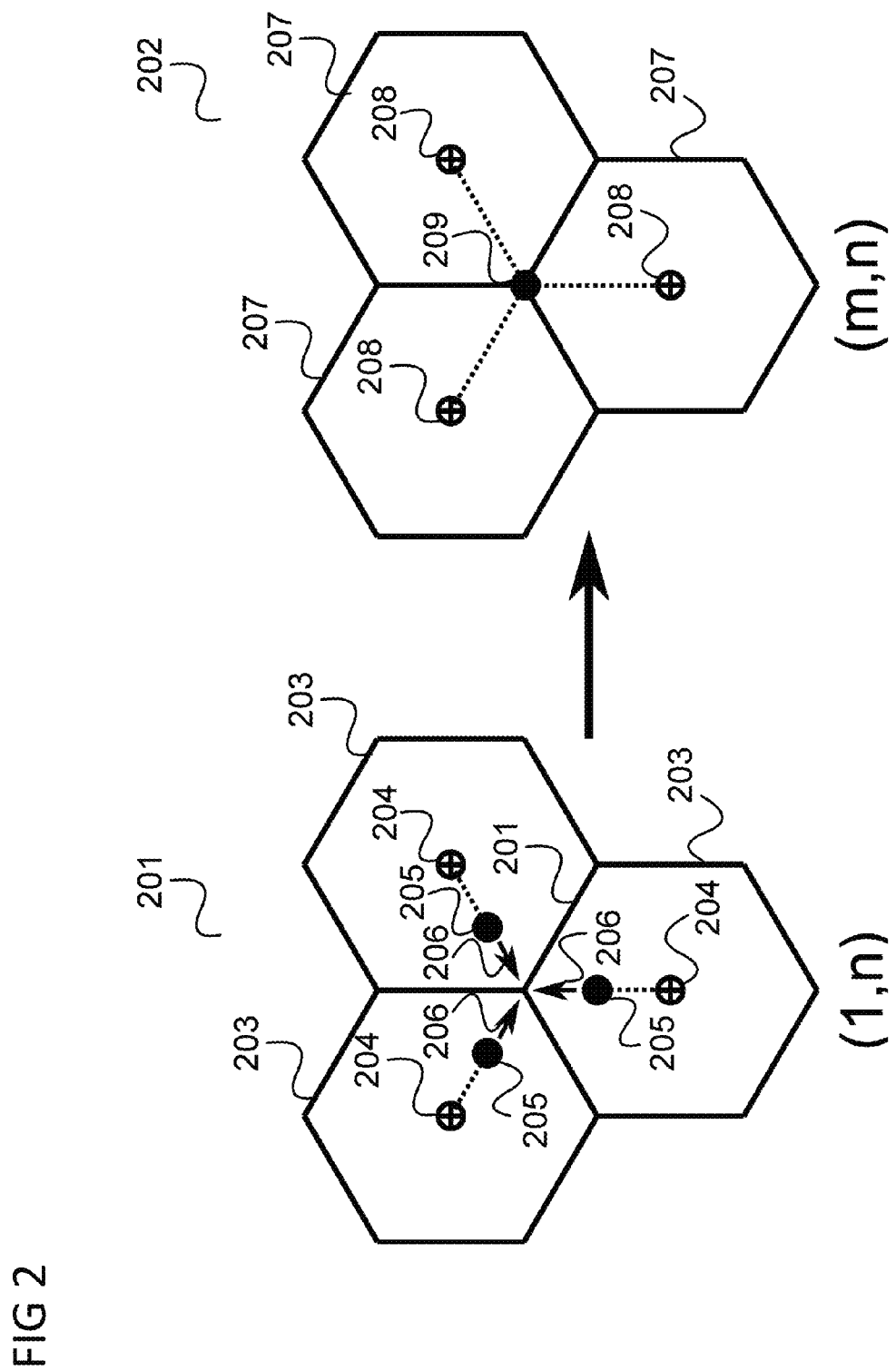
FIG. 2 shows a first communication arrangement and a second communication arrangement.

FIG. 2 shows a first communication arrangement 201 and a second communication arrangement 202.

The first communication arrangement 20l comprises a plurality of radio cells 203, each being operated by a base station 204. In each radio cell 203, a relay node 205 is located. This can be seen as a (1, n) scenario (where in the example shown, n=1).

As indicated by arrows 206, the relay nodes 205 may be grouped into a shared relay node to arrive at the second communication arrangement 202. The second communication arrangement also includes a plurality of radio cells 207, each being operated by a base station 208 and a shared relay node 209. This can be seen as a (m, n) scenario wherein in this example m=3 (since the shared relay node 209 is associated with 3 base stations 208). In the shown example, n=1. However, it should be noted that n may for example be higher, e.g. n=6 such that a shared relay node is arranged at each corner of each radio cell 207.

The concept of (m,n)-relaying can for example be defined as follows, e.g. applied to a half-duplex cellular OFDMA (Orthogonal Division Multiple Access) communication system regulated by a time division broadcast protocol that extends over two time slots:

A relay-augmented cellular network, in which
- each primary station (e.g. base station) is associated with up to n secondary stations (e.g. relay stations),
- each secondary station is jointly backhauled by up to m primary stations,
- each secondary serving station can serve up to m recipients per radio resources is said to employ (m, n)-relaying.

From applying such a definition, it is apparent that all schemes that enforce the uniform deployment of n conventional relay nodes per base station can be indicated by the term (1, n)-relaying.

It should be noted that the definition given above gives no indication on how the two slots should be coupled or on how to perform the backhauling.

Among the (m, n)-relaying schemes that require no coordination between the primary serving stations, assuming a block-fading channel model and perfect knowledge of CSI (Channel State Information) at the transmitters, one that operates in the first slot according to spatial demultiplexing via successive interference cancellation (SIC) achieves the capacity offered by the multi-user channel between m base stations and an associated relay node. Specifically, assuming that each base station is equipped with one transmit antenna and that each relay station possesses m receive antennas, for a given sub-carrier and a set C of m base stations associated with a relay node, a rate of $$R_C^{(1)} = B \log_2 \det\left( I_m + R_C^{-1} \sum_{i \in C} p_i h_i h_i^H \right) \qquad (1)$$

may be attained with such a technique, wherein $I_m$ is the identity matrix of rank m, $h_i$ and $p_i$ represent respectively the channel vector and the power associated to the i-th base station belong to C and $$R_C = \sum_{i \notin C} p_i h_i h_i^H + \sigma_w^2 I_m, \qquad (2)$$

with $h_i$ and $\sigma_w^2$ indicating the channel perceived by the relay node because of the i-th interferer and the variance of the Gaussian noise.

If for the first hop (i.e. for the transmission from the base station to the relay node in case of downlink or for the transmission from the communication terminal to the relay node in case of uplink) no cooperation should be assumed among the transmitters, for the second hop (i.e. for the transmission from the relay node to the communication terminal in case of downlink or for the transmission from the relay node to the base station in case of uplink) the recipients are the entities that possess no means to cooperate. Such duality between the first hop and the second hop can be fully captured by employing dirty paper coding in the second hop. For the block-fading channel model with perfect CSI knowledge at the transmitters, dirty paper coding allows to achieve the capacity of the multi-user channel between the relay node and m recipients. Specifically, assuming that each relay station is equipped with m transmit antennas and that each recipient has one receive antenna, for a given sub-carrier and a set U of m mobile stations associated with a relay node, the achievable rate is $$R_U^{(2)} = \sum_{k \in U} \log_2\left(1 + \frac{\|P_k^{1/2} W_k h_k^T\|^2}{\rho_k^2 + \sum_{u>k} \|P_u^{1/2} W_u h_u^T\|^2}\right), \quad (3)$$

where $h_k^T$, $W_k$ and $P_k$ indicate, respectively, the channel vector experienced by the k-th recipient because of the relay station, the beamforming matrix and the power allocated to the m antennas at the relay station while addressing the k-th recipient and $\rho_k^2$ is the variance of the Gaussian interference plus noise perceived by the k-th recipient. The inequality in the subscript of the sum that represents the interference indicates that, when beamforming is coupled with dirty paper coding, the coding order has a significant impact on the rate and that, therefore, it should be carefully selected.

The beamforming matrices may for example be designed to orthogonalize the spatial signatures of the channels. Specifically, this means that the beamforming may be chosen as $$W_k = u_k u_k^H$$

with $$u_k = \underset{v \in C^8}{\operatorname{argmax}} |h_k^* v|$$

s.t. $\|v\| = 1$ $h_{u<k}^* v = 0$ while the precoding order is for example selected to maximize the achievable rate.

If m=1, |C|=1 and |U|=1, if the single base station belonging to C is indicated as the i-th base station and the single recipient (i.e. communication terminal) belonging to U is indicated as the k-th recipient, the equations (2) and (3) degenerate to $$R_i^{(1)} = \log_2\left(1 + \frac{p_i h_i h_i^*}{r_i^2}\right), \quad (4)$$

$$R_k^{(2)} = \log_2\left(1 + \frac{p_k h_k h_k^*}{\rho_k^2}\right), \quad (5)$$

with $r_i^2$ representing the variance of the Gaussian interference plus noise perceived by the relay node while communicating with the i-th base station.

(1, 6)-relaying and (3, 6)-relaying can be seen to be of high practical interest for cellular networks (i.e. cellular communication systems). The potential of (m, n)-relaying can therefore for example be evaluated by comparing the achievable throughputs that can be used by (3, 6)-relaying to those granted by (1, 6)-relaying and BSC. For example, such configurations may be analysed for a six-sector OFDMA system serving six users per cell and operating over six sub-carriers according to a frequency reuse pattern of factor ⅙. Results of such an evaluation thus depict the behaviour of a system constantly at full load.

According to (1, 6)-relaying, for a block-fading channel model and coupling the two slots, the overall achievable rate across the two-hop downlink chain is $$R_{i,k}^{(1,6)} = \min\{R_i^{(1)}, R_k^{(2)}\}$$

For (3, 6)-relaying, coupling the two slots and using the rates given by equations (2) and (3), the overall achievable rate across the two-hop downlink chain can be indicated as $$R_{C,U}^{(3,6)} = \min\{R_C^{(1)}, R_U^{(2)}\}$$

For base station cooperation, also using a frequency reuse pattern of a factor of ⅙, the overall achievable rate across the one-hop downlink chain can be expressed as $$R_{C,U}^{BSC} = R_{C,U}^{(1)} + R_{C,U}^{(2)}$$

where $R_{C,U}^{(1)}$ and $R_{C,U}^{(2)}$ are as defined in equation (3).

Given a transmit antenna and a receive antenna communicating over the s-th sub-carrier, a block-fading channel model can be written as $$y = h\sqrt{P}x + w',$$

where y indicates the received symbol, h is the complex channel gain, P is the power allocated to the symbol, x is the transmitted symbol and represents the white Gaussian noise and interference that affects the communication. The complex channel gain is here defined as $$h = \gamma(K)\sqrt{10 - \frac{\Gamma(d) + \sigma \mathcal{N}(0,1) - \beta + \phi(\theta)}{10}} \quad (5)$$

where γ is the fast fading term and can be expressed as $$\gamma(K) = \frac{\mathcal{N}(0,1) + \mathcal{N}(0,\sqrt{K})}{\sqrt{2(K+1)}} + j\frac{\mathcal{N}(0,1) + \mathcal{N}(0,\sqrt{K})}{\sqrt{2(K+1)}},$$

Γ(d) indicates the path loss at a distance d from the transmit antenna, σ is the shadow fading term, β represents the gain of the transmit antenna along the boresight direction, ϕ(θ) describes the attenuation imposed by the radiation pattern in a direction that forms an angle θ with the boresight of the transmit antenna and $\mathcal{N}(0, 1)$ indicates a random real number extracted by a normal standard distribution.

As mentioned above, a cellular communication network such as the communication system 100 is a system whose performance is limited by interference. According to one embodiment, (m,n)-relaying is used as a technique to mitigate interference.

As mentioned, other techniques may be used to achieve interference mitigation for 3GPP LTE-Advanced communication systems. Cooperative multipoint transmission with full payload and CSI dissemination (hereafter referred to as CoMP) may be seen as an alternative to (m,n)-relaying. From a performance point of view, CoMP can be considered as advantageous. From an economic perspective, however, its implementation is conspicuously expensive since it requires the deployment of high-capacity (e.g. fiber) links between the eNBs 103.

According to various embodiments, an integration of (m,n)-relaying into a 3GPP LTE-Advanced network (i.e. a communication system according to LTE-Advanced) is provided that may allow to achieve the performances of CoMP at lower deployment costs in one case and to complement CoMP and achieve higher performances in another case. These two cases correspond to two deployment scenarios in which:
1. high capacity eNB-eNB links cannot be deployed,
2. high capacity eNB-eNB links can be deployed.

Embodiments described in the following, may all be based on a framework in which a relay station transmits or forwards data to a plurality of mobile stations or, in other words the relay station serves the mobile stations, wherein the relay station is backhauled by a plurality of base stations. In such a case, the data transmissions may be carried out in accordance with a multi-user scenario. This can for example be understood as the relay station serving the mobile stations of the plurality of mobile stations concurrently on the same (i.e. identical) radio communication resources. In other words, the communication between the relay node and the mobile stations of the plurality of mobile stations is carried out using radio communication resources that are shared between all the communications (or communication connections) between the relay node and the plurality of mobile stations. For example, communication between the relay node and a first mobile station of the plurality of mobile stations may be carried out simultaneously and using the same communication resources (i.e. using the same one or more radio frequencies at the same time) as the communication between the relay node and a second mobile station of the plurality of mobile stations.

The base stations serving the same relay station (in other words, being associated with the same base station) may be seen as a cooperative group. It should be noted that a base station may be part of more than one cooperative group, i.e. a base station may be associated with more than one relay station Further, in embodiments described in the following, communication of data between a plurality of base stations backhauling the relay node may be carried out using the same (i.e. identical) communication resources for all the base stations of the plurality of base stations. In other words, communication between a first base station and the relay node may be carried out simultaneously and using the same communication resources (i.e. using the same one or more radio frequencies at the same time) as the communication between a second base station of the plurality of base stations and the relay node.

Thus, using "identical communication resources" may be understood to refer to the usage of the same frequency resources (e.g. the same radio frequency, carriers having the same center frequency, or resource blocks corresponding to the same frequency) at the same time. The receiver of different signals (or different data) having been transmitted can for example separate the signals (or the data) from each other using MMSE-SIC (Minimum Mean Square Error-Successive Interference Cancellation) filtering.

For the transmission of data from the base stations to the relay node and the transmission of data from the relay node to the mobile stations different communication resources are used in various embodiments. In particular, for the transmission of data from the base stations to the relay node and the transmission of data from the relay node to the mobile stations different time slots are used.

Figure 3:
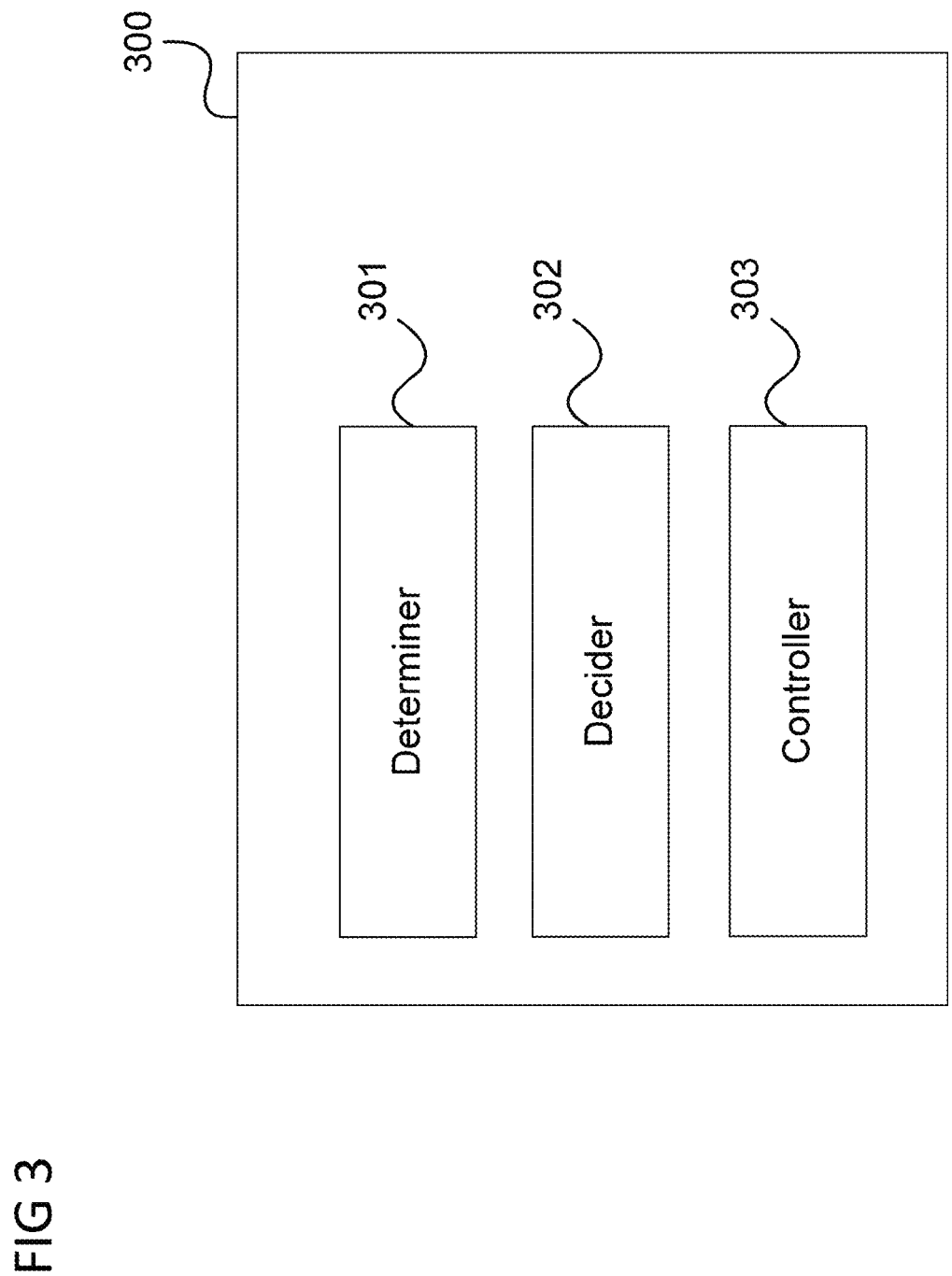
FIG. 3 shows a mobile communication system according to an embodiment.

According to one embodiment, a mobile communication system is provided as illustrated in FIG. 3.

FIG. 3 shows a mobile communication system 300 according to an embodiment.

The mobile communication system 300 comprises a plurality of base stations, a relay station, and a plurality of mobile stations, wherein, in a first relaying mode, each base station is configured to transmit data to be forwarded to at least one mobile station of the plurality of mobile stations to the relay station using first communication resources, wherein the first communication resources for all base stations of the plurality of base stations may be identical and wherein the relay node is configured to transmit data to the plurality of mobile stations using second communication resources, wherein the second communication resources for all mobile stations of the plurality of mobile stations may be identical.

The mobile communication system 300 further comprises a determiner 301 configured to determine, for each mobile station, the distance between the mobile station and at least one of the base stations or between the mobile station and the relay station, a decider 302 configured to decide whether data transmission between the at least one base station and the mobile station is carried out in the first relaying mode or in a second relaying mode based on the determined distance and a controller 303 configured to control the mobile communication system based on the result of the decision by the decider.

According to one embodiment, in other words, a mobile station is served by a relay station based on how far it is from the base station or the relay station. If the mobile station is for example sufficiently near to the base station it is served directly by the base station. In other words, for example, a circular area of the base station is served by the base station itself while the remaining areas (of the coverage area of the base station, e.g. the radio cell operated by the base station) are served via relaying. Alternatively, a circular area around the relay station, or, in case of a plurality of relay stations, circular areas around the relay stations are served by relaying via the relay stations while remaining areas are directly served by the base station, i.e. are without relaying between a mobile station and the base station.

It should be noted that the second communication resources are identical for a plurality of mobile terminals, they may be different for different sets of mobile terminal when the number of mobile terminals is very high (e.g. higher than m). It should be noted that similarly, the second communication resources are identical for a plurality of base stations, but may be different for different sets of base stations.

The determiner may be part of the relay station but may also be part of a mobile station. For example, according to one embodiment, a plurality of relay stations are arranged within an area spanned by a plurality of adjacent base stations. Each of a plurality of mobile stations (i.e. communication terminals) within the coverage area of the base stations determines and reports (e.g. to one or more of the relay stations and/or one or more of the base stations) whether its distance to its nearest relay station of the relay stations is below a predetermined threshold. The relay stations then decide whether the mobile stations are to be served by the relay stations. For example, if the distance of each mobile station to its nearest relay station is below a predetermined threshold, it is decided that the mobile stations are served by the relay stations. In case that all present mobile stations are thus served by the relay stations, the serving by base stations may then be switched off.

The first relaying mode is for example that data transmission between a plurality of base stations and a plurality of mobile stations is carried out via the relay station associated with the base stations.

In one embodiment, the second relaying mode is that data transmission between at least one base station and one mobile station is carried out without the relay station associated with the base stations. In other words, in the second relaying mode, data transmission between at least one base station and one mobile station is carried out using a direct (radio) communication connection between the base station and the mobile station. It should be noted that the communication using the direct communication connection may be carried out using the same communication resources as used for the communication between the other base stations and the associated relay node and used for the communication between the relay node and the mobile stations. Alternatively, orthogonal communication resources may be used for the direct communication connections.

The second relaying mode is for example that data transmission between the at least one base station and the mobile station is carried out without any relay station.

According to one embodiment, the determiner, the decider, and the controller are part of the at least one base station, the relay station, the mobile station or a network component of the mobile communication system.

According to one embodiment the decider is configured to decide, for each mobile station, that the data transmission between the at least one base station and the mobile station is carried out in the first relaying mode if the distance between the mobile station and the at least one base station is above a first pre-determined threshold or if the distance between the mobile station and the relay station is below a second pre-determined threshold.

According to one embodiment, the decider is configured to decide that the data transmission between the at least one base station and the mobile station is carried out in the second relaying mode if the distance between the mobile station and the base station is below a first pre-determined threshold or if the distance between the mobile station and the relay station is above a second pre-determined threshold.

The mobile communication system has for example a (m,n)-relaying architecture with m higher than 1.

Figure 4:
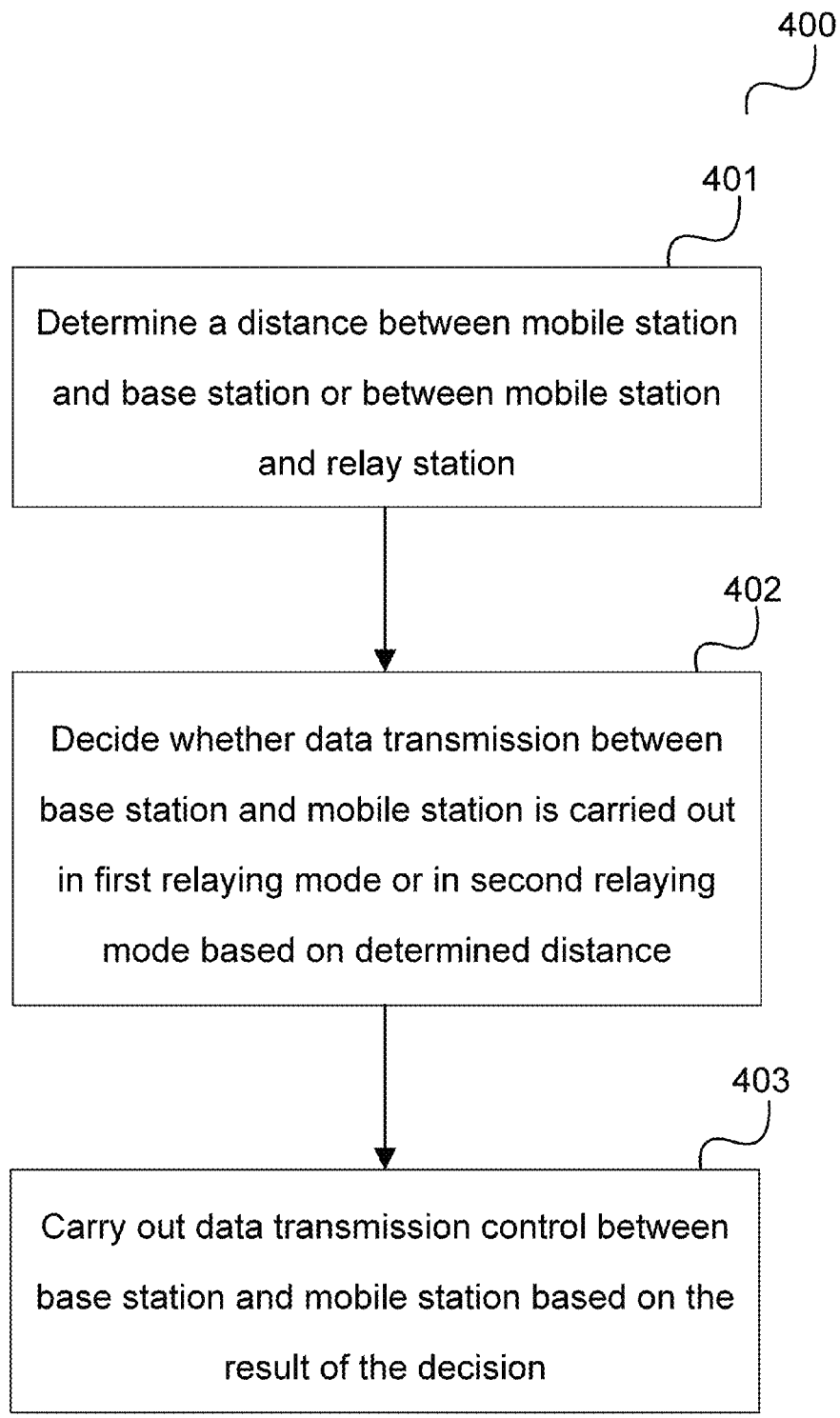
FIG. 4 shows a flow diagram according to an embodiment.

The communication system for example carries out a method as illustrated in FIG. 4.

FIG. 4 shows a flow diagram 400 according to an embodiment.

The flow diagram 400 illustrates a method for data transmission in a mobile communication system comprising a plurality of base stations, a relay station, and a plurality of mobile stations, wherein, in a first relaying mode, each base station is configured to transmit data to be forwarded to at least one associated mobile station of the plurality of mobile stations to the relay station using first communication resources, wherein the first communication resources for all base stations of the plurality of base stations are identical and wherein the relay node is configured to transmit data to the plurality of mobile stations using second communication resources, wherein the second communication resources for all mobile stations of the plurality of mobile stations are identical.

In 401, a distance between the mobile station and at least one of the base stations or between the mobile station and the relay station is determined.

In 402, it is decided whether data transmission between the at least one base station and the mobile station is carried out in the first relaying mode or in a second relaying mode based on the determined distance.

In 403, data transmission is carried out between the at least one base station and the mobile station based on the result of the decision by the decider.

Figure 5:
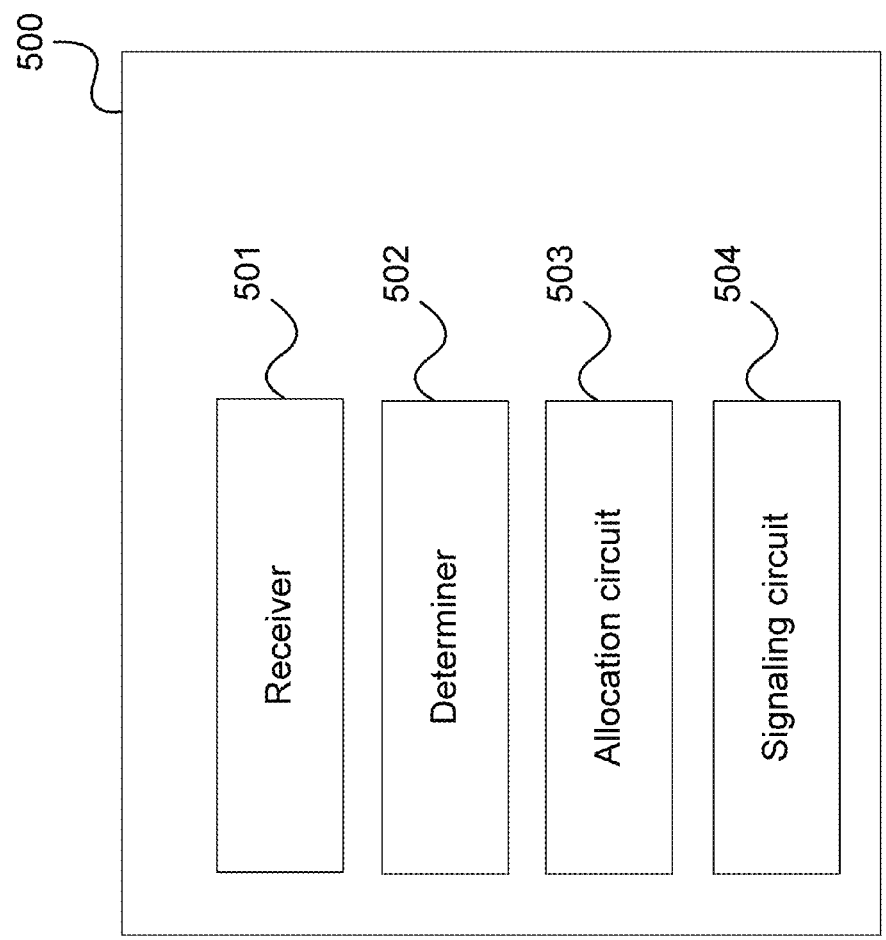
FIG. 5 shows a relay station of a mobile communication system according to an embodiment.

According to one embodiment, a relay station is provided as illustrated in FIG. 5.

FIG. 5 shows a relay station 500 of a mobile communication system according to an embodiment.

The relay station 500 comprises a receiver 501 configured to receive a connection request from a mobile station of the mobile communication system and a determiner 502 configured to determine whether communication resources of the mobile communication system should be allocated to the mobile station.

The relay station 500 further comprises an allocation circuit 503 configured to allocate communication resources to the mobile station if the determiner has determined that communication resources should be allocated to the mobile station Further, the relay station 500 comprises a signaling circuit 504 configured to signal to a communication device of the mobile communication system the allocation of communication resources to the mobile station if the determiner has determined that communication resources should be allocated to the mobile station.

According to one embodiment, in other words, the decision on whether communication resources should be allocated to a mobile station (i.e. communication terminal) and, if yes, which communication resources should be allocated to the communication terminal is carried out by a relay station. In other words, the point of attachment to the radio access network for a communication terminal may be seen to be the relay station according to one embodiment. The communication device to which the allocation is signaled is for example a base station of the communication system. It may also be another relay station of the communication system, for example in case that only one relay station of a plurality of relay stations reports the communication resource allocation determined and/or carried out by the plurality of the relay stations. Thus, the relay station may signal the allocation to another relay station for forwarding the allocation (i.e. to be forwarded) to a base station of the mobile communication system. Accordingly, the communication device may in the following be understood as a base station or as a relay station.

The determining (or deciding) carried out by the determiner may for example be based on information received from one or more other relay stations. For example, there is a common decision of a plurality of relay stations whether one or more communication terminals are served by the relay stations or whether they should for example be served directly by one or more base stations.

According to one embodiment the signaling circuit is configured to signal, to the communication device, the allocation of communication resources to the mobile station by means of a radio connection between the relay station and the communication device.

The signaling circuit is for example configured to signal, to the communication device, the allocation of communication resources to the mobile station by means of a radio feedback link between the relay station and the communication device.

The allocation circuit is for example configured to select communication resources to be allocated to the mobile station from a plurality of communication resources.

In one embodiment, the allocation circuit is configured to select communications resources to be allocated to the mobile station from a plurality of communications resources cycling according to a frequency hopping pattern.

In one embodiment, the signaling circuit is configured to signal to the communication device which communication resources have been allocated to the mobile station.

Figure 6:
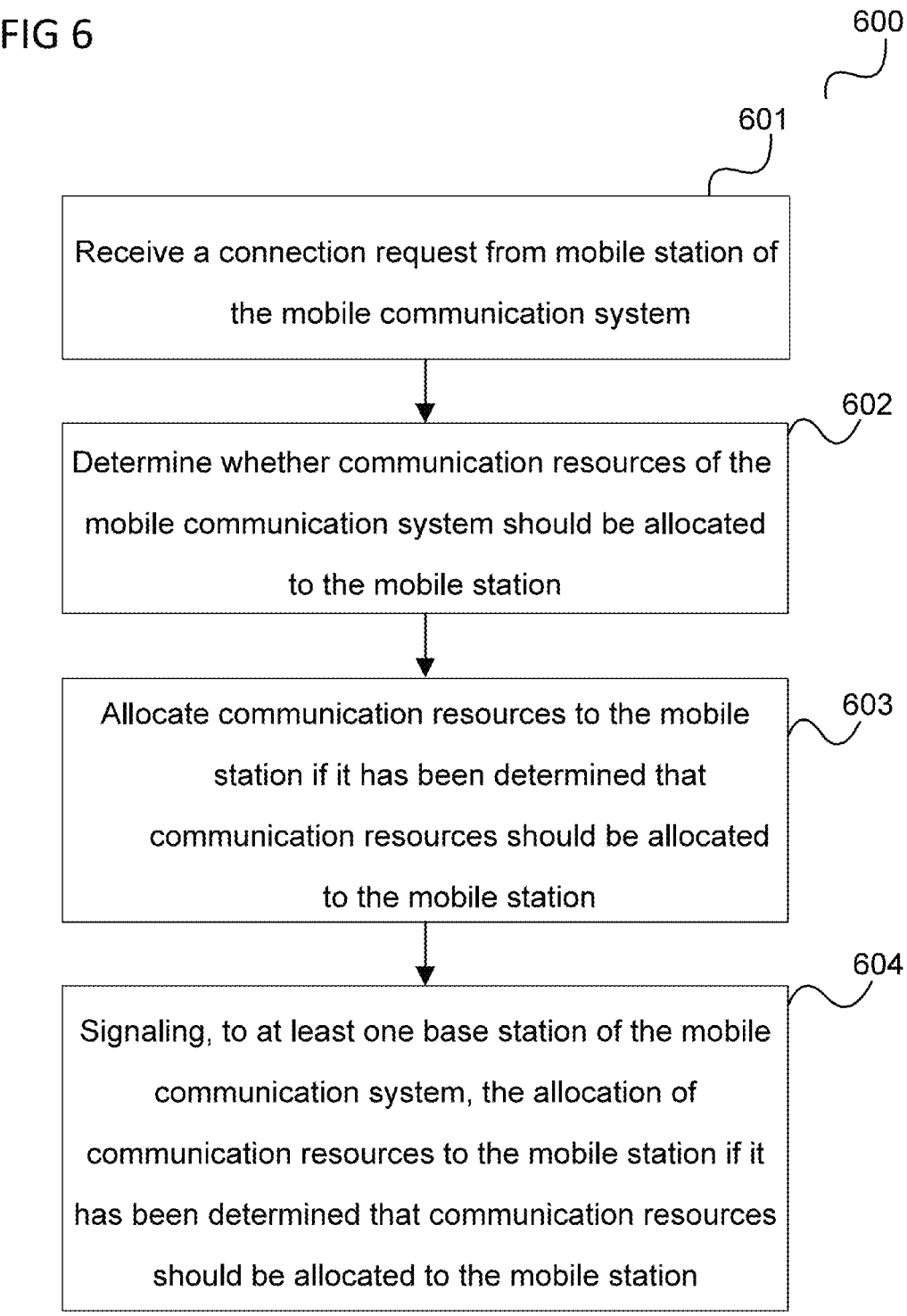
FIG. 6 shows a flow diagram according to an embodiment.

The relay station 500 for example carries out a method as illustrated in FIG. 6.

FIG. 6 shows a flow diagram 600 according to an embodiment.

The flow diagram 600 illustrates a method for communication resource allocation.

In 601 a relay station of a mobile communication system receives a connection request from a mobile station of the mobile communication system.

In 602 it is determined by the relay station whether communication resources of the mobile communication system should be allocated to the mobile station.

In 603 communication resources are allocated by the relay station to the mobile station if it has been determined that communication resources should be allocated to the mobile station.

In 604 the allocation of communication resources to the mobile station is signaled by the relay station to a communication device of the mobile communication system if it has been determined that communication resources should be allocated to the mobile station.

Figure 7:
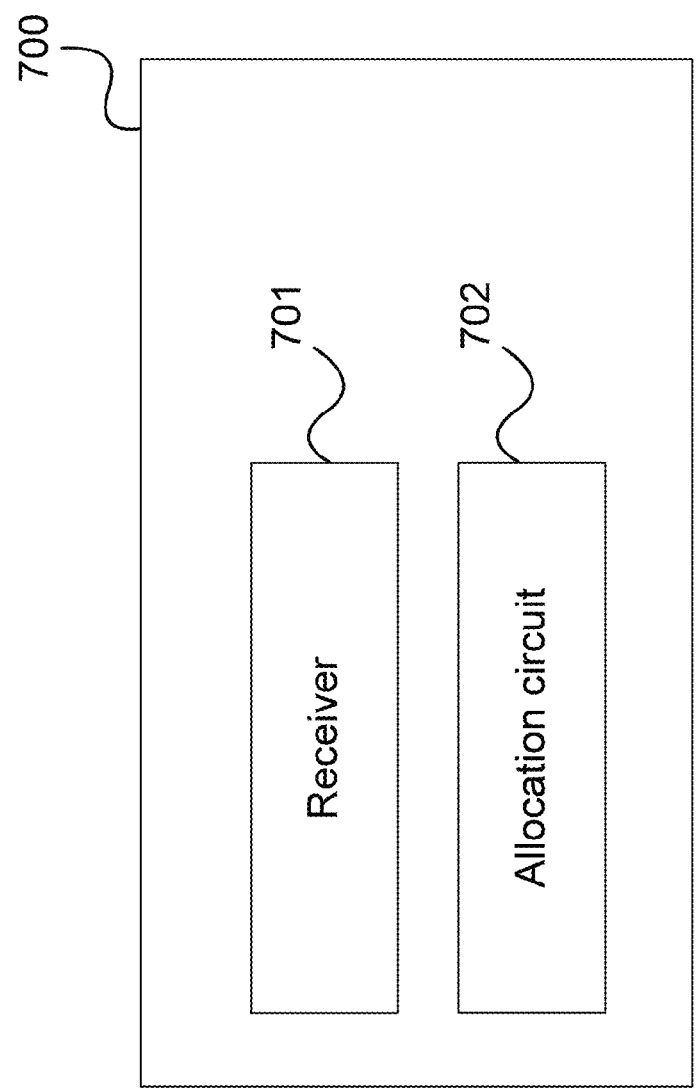
FIG. 7 shows a base station according to an embodiment.

The relay station 500 for example forwards data from (in downlink) or to (in uplink) a base station as illustrated in FIG. 7.

FIG. 7 shows a base station 700 according to an embodiment.

The base station 700 comprises a receiver 701 configured to receive, from a relay station, a specification of communication resources allocated by the relay station 700 to at least one mobile station The base station 700 further comprises an allocation circuit 702 configured to allocate communication resources taking into account the communication resources already allocated by the relay station.

The allocation circuit is for example configured to allocate communication resources which have not already been allocated by the relay station.

The specification for example specifies radio resources allocated by the relay station to at least one mobile station. The specification may also indicate that no communication resources have been allocated by the relay station to any mobile station.

The allocation circuit is for example configured to allocate communication resources to at least one other mobile station (e.g. a set of mobile stations) taking into account the radio resources already allocated by the relay station.

Figure 8:
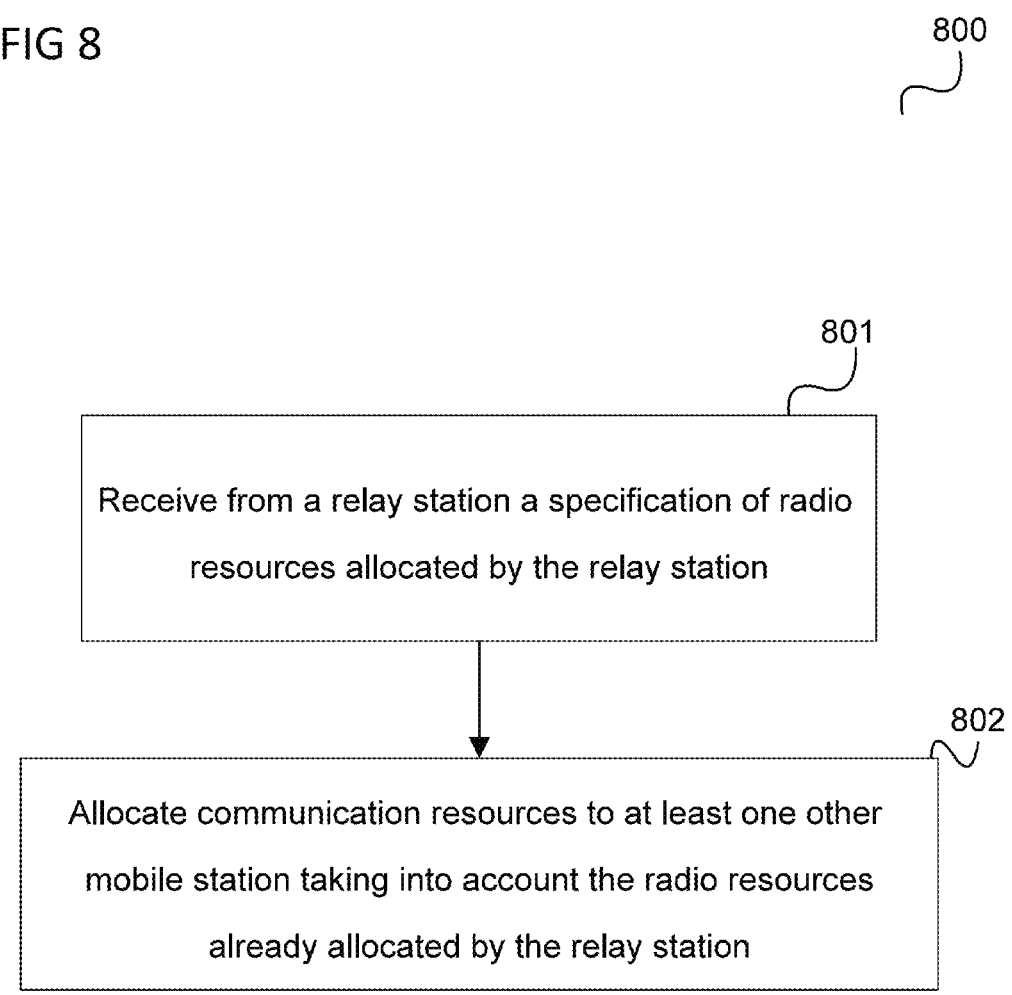
FIG. 8 shows a flow diagram according to an embodiment.

The base station 700 for example carries out a method as illustrated in FIG. 8.

FIG. 8 shows a flow diagram 800 according to an embodiment.

The flow diagram 800 illustrates a method for communication resource allocation.

In 801, a base station receives, from a relay station, a specification of radio resources allocated by the relay station.

In 802, the base station allocates communication taking into account the radio resources already allocated by the relay station.

The specification for example specifies radio resources allocated by the relay station to at least one mobile station. The specification may also indicate that no communication resources have been allocated by the relay station to any mobile station.

The base station for example allocates communication resources to at least one other mobile station (e.g. a set of mobile stations) taking into account the radio resources already allocated by the relay station.

Figure 9:
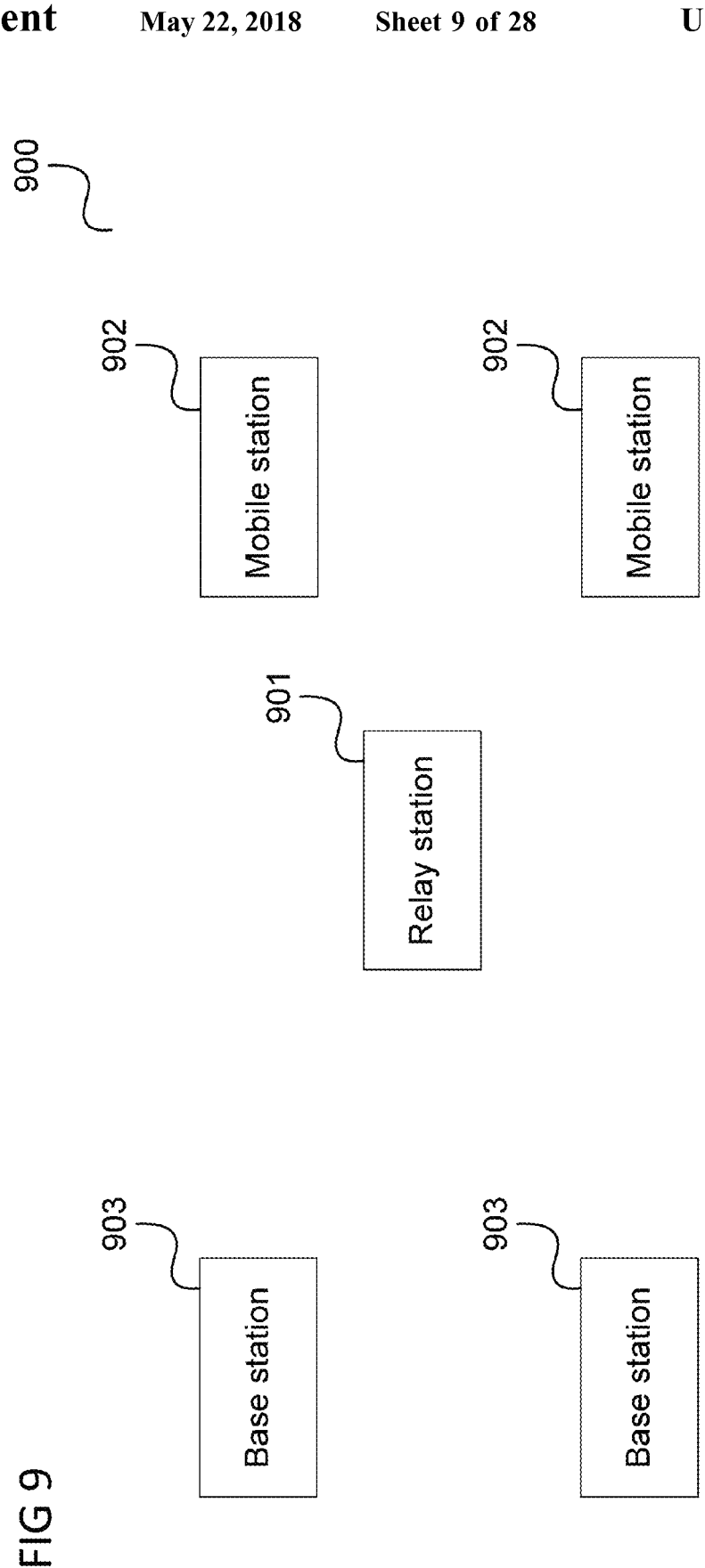
FIG. 9 shows a mobile communication network of a communication system according to an embodiment.

According to one embodiment, a mobile communication network is provided as illustrated in FIG. 9.

FIG. 9 shows a mobile communication network 900 of a communication system according to an embodiment.

The mobile communication network 900 comprises at least one relay station 901 and a plurality of mobile stations 902.

The mobile communication network 900 further comprises a plurality of base stations 903 configured to transmit data to be transmitted to the mobile stations to the relay station by means of single user MIMO.

According to one embodiment, in other words, the transmission of data to be forwarded to a set of mobile stations from a plurality of base stations to a relay station (also referred to as backhauling) is carried out in accordance with single user MIMO (SU-MIMO). This means that each base station can be seen as one transmit antenna of a MIMO system and the relay station corresponds to the set of receive antennas of a MIMO system. The data to be forwarded to the set of mobile stations is transmitted in a (single) common data stream, i.e. the relay station is treated as the receiver of a SU-MIMO communication and the base stations are treated as the single transmitter of the SU-MIMO communication. This may further be seen as a combination of CoMP with (m,n)-relaying.

The relay station is for example a fixed relay station.

According to one embodiment, the base stations are interconnected and are configured to exchange messages via the interconnections for controlling and feeding the single user MIMO data transmission to the relay station.

According to one embodiment, the base stations are configured to transmit the data to be transmitted to the mobile stations to the relay station by means of singular value decomposition MIMO.

The mobile communication system has for example a (m,n)-relaying architecture with m higher than 1.

Figure 10:
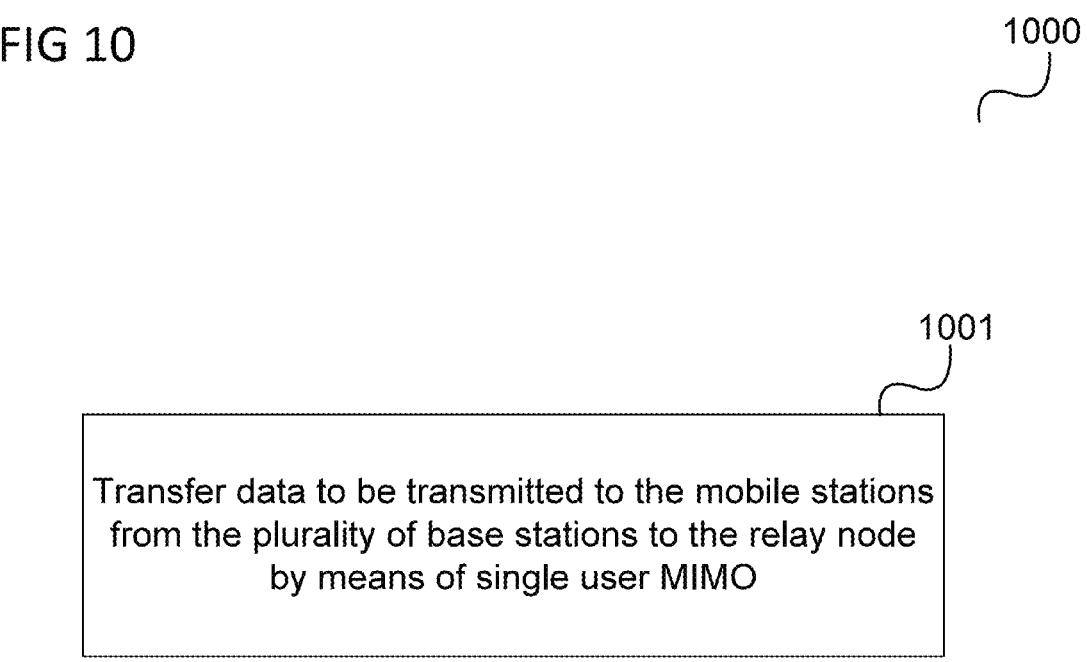
FIG. 10 shows a flow diagram according to an embodiment.

The mobile communication network 900 for example carries out a method as illustrated in FIG. 10.

FIG. 10 shows a flow diagram 1000 according to an embodiment.

The flow diagram 1000 illustrates a method for relaying data in a mobile communication system comprising a plurality of base stations, at least one relay station and a plurality of mobile stations.

In 1001 the data to be transmitted to the mobile stations from the plurality of base stations to the relay node is transferred by means of single user MIMO.

Figure 11:
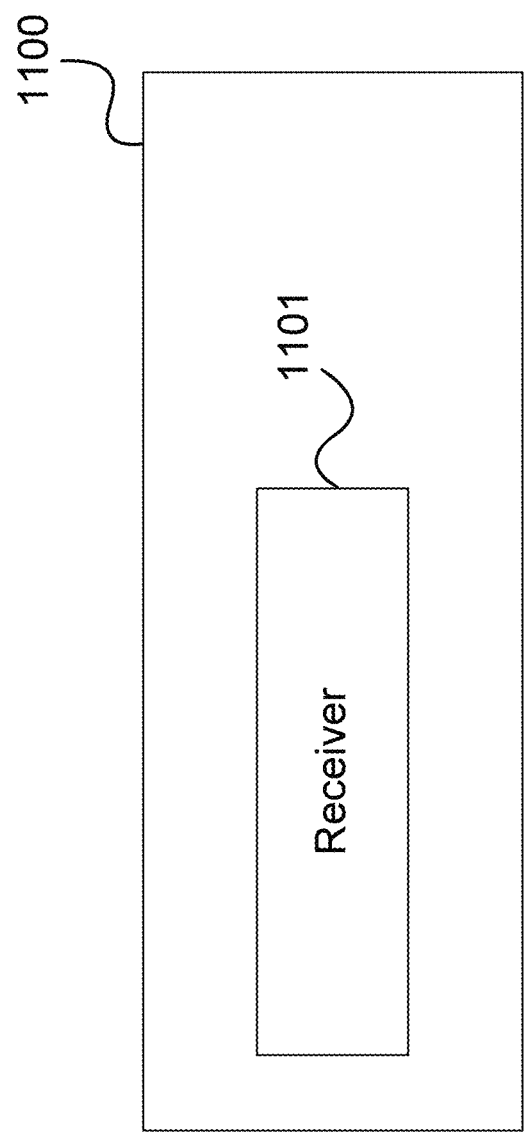
FIG. 11 shows a relay station according to an embodiment.

The mobile communication network 900 for example communicates with a relay station as illustrated in FIG. 11.

FIG. 11 shows a relay station 1100 according to an embodiment.

The relay station 1100 is a relay station of a mobile communication system, wherein the mobile communication system comprises a mobile communication network with a plurality of base stations and a plurality of mobile stations.

The relay station 1100 comprises a receiver 1101 configured to receive data to be transmitted to the mobile stations by means of single user MIMO from the base stations.

Figure 12:
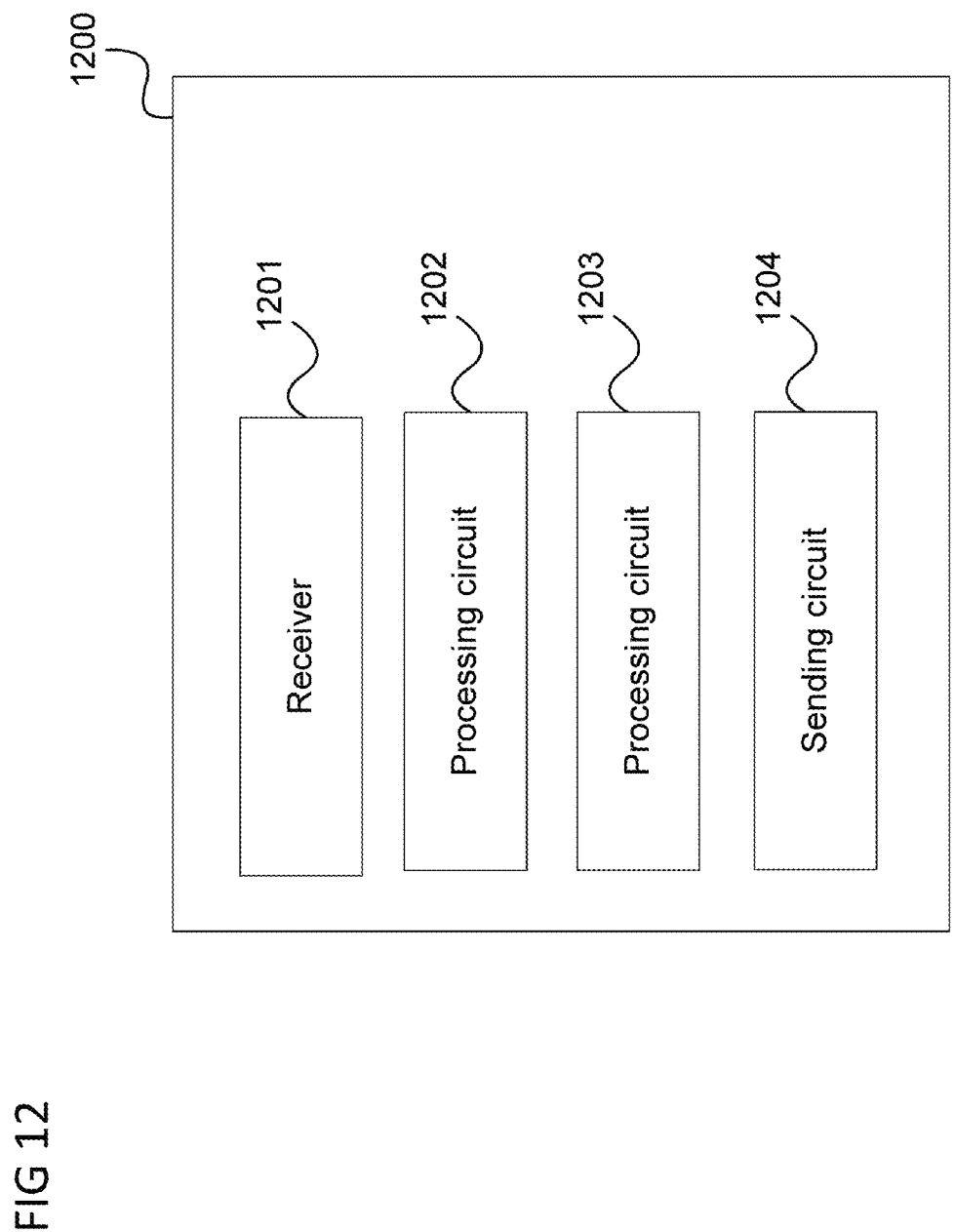
FIG. 12 shows a relay station according to an embodiment.

According to one embodiment, a relay station is provided as illustrated in FIG. 12.

FIG. 12 shows a relay station 1200 according to an embodiment.

The relay station 1200 comprises a receiver 1201 configured to receive signals from a plurality of base stations.

Further, the relay station 1200 comprises a first processing circuit 1202 configured to determine at least one data stream from the received signals, wherein the data stream includes data to be transmitted to a plurality of mobile stations and a second processing circuit 1203 configured to determine, for each mobile station of the plurality of mobile stations, the data to be transmitted to the mobile station from the data stream.

The relay station 1200 further comprises a sending circuit 1204 configured to transmit to each mobile station the data determined to be transmitted to the mobile station.

According to one embodiment, in other words, data to be forwarded by a relay station to a plurality of mobile stations (i.e. communication terminals) is transmitted to the relay station by means of an overall (super-)stream from which the relay station 1200 extracts the data to be forwarded to the various mobile stations.

According to one embodiment, the first processing circuit is configured to determine a plurality of data streams from the received signals, wherein each data stream includes data to be transmitted to the plurality of mobile stations.

Each data stream is for example associated with one of the base stations and includes the data to be transmitted from this base station to the plurality of mobile stations served by it.

For example, each data stream is created by merging the data to be transmitted to the mobile stations and the second processing circuit separates the payloads for the mobile stations.

According to one embodiment, each data stream is created such that the data to be transmitted to the mobile stations is separated in at least one of time and frequency and the second processing circuit retrieves the payload for the mobile stations.

Each data stream is for example created by merging the data to be transmitted to the mobile stations in a way that the second processing circuit can reversely separate the payloads for each mobile station.

According to one embodiment, each data stream is created such that the data to be transmitted to the mobile stations is separated in at least one of time and frequency and the second processing circuit finds the payloads for each mobile station already separated.

The communication resources are for example resource blocks.

According to one embodiment, the data stream includes a codeword and the relay node is configured to extract data to be transmitted to the mobile stations from the codeword.

For example, the relay node is configured to extract the data to be transmitted to two or more of the mobile stations from the codeword by decoding the codeword.

Figure 13:
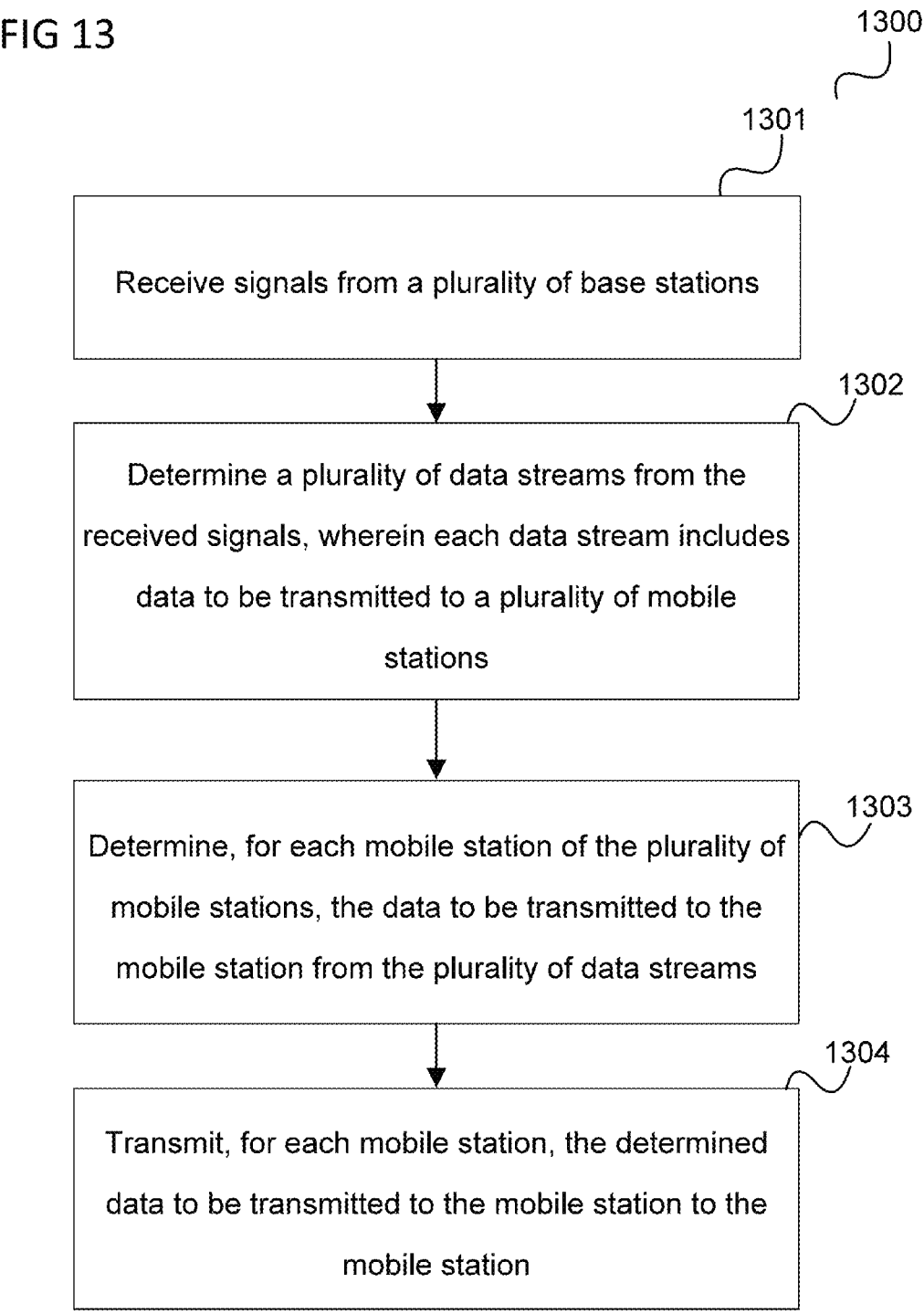
FIG. 13 shows a flow diagram according to an embodiment.

The relay station 1200 for example carries out a method as illustrated in FIG. 13.

FIG. 13 shows a flow diagram 1300 according to an embodiment.

The flow diagram 1300 illustrates a method for receiving data in a relay station of a mobile communication system.

In 1301, signals are received from a plurality of base stations.

In 1302, a plurality of data streams are received from the received signals, wherein each data stream includes data to be transmitted to a plurality of mobile stations.

In 1303, for each mobile station of the plurality of mobile stations, the data to be transmitted to the mobile station is determined from the plurality of data streams.

In 1304, for each mobile station, the determined data to be transmitted to the mobile station is transmitted to the mobile station.

Figure 14:
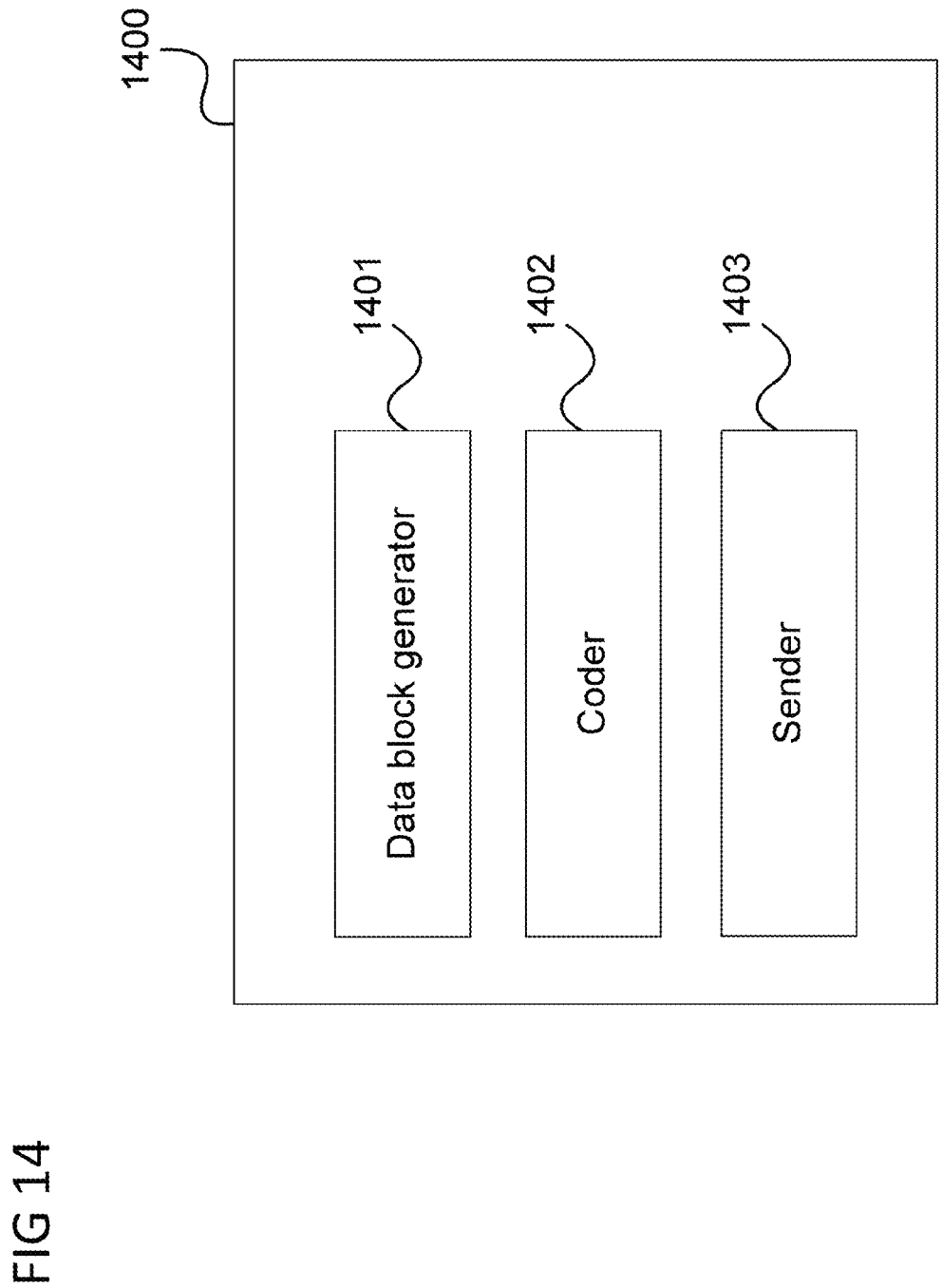
FIG. 14 shows a base station according to an embodiment.
Figure 15:
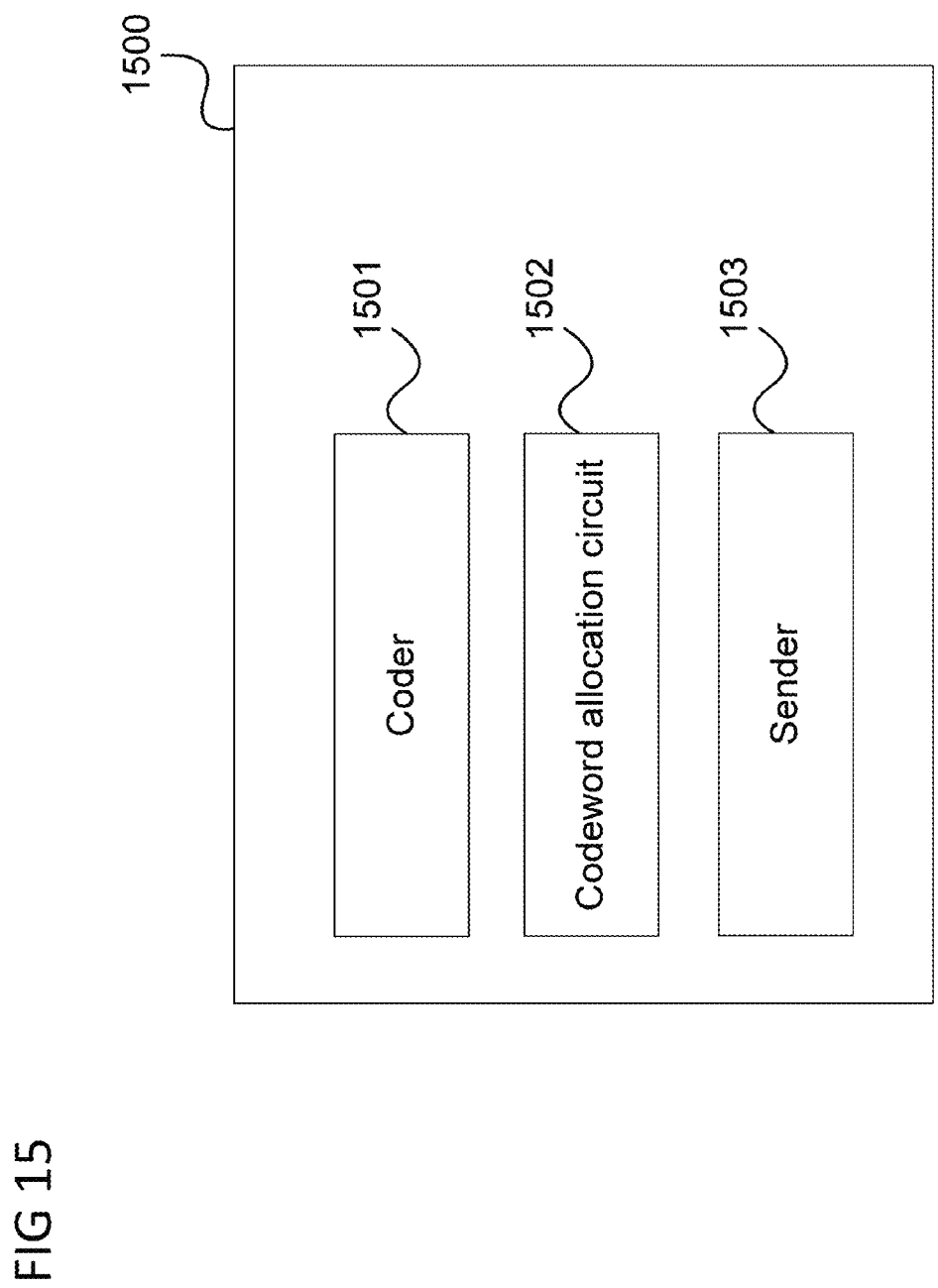
FIG. 15 shows a base station according to an embodiment.

The relay station 1200 for example forwards data from (in downlink) or to (in uplink) a base station as shown in FIG. 14 or 15.

FIG. 14 shows a base station 1400 according to an embodiment.

The base station 1400 is a base station of a mobile communication system comprising a relay station and a plurality of mobile stations.

The base station 1400 comprises a data block generator 1401 configured to generate a data block from a plurality of payloads, wherein the plurality of payloads includes a payload for each mobile station of the plurality of mobile stations that contains the data to be transmitted to the mobile station by merging the payloads into the data block.

The base station 1400 further comprises a coder 1402 configured to generate codewords from the data block.

The base station 1400 further comprises a sender 1403 configured to send the codewords to the relay station.

FIG. 15 shows a base station 1500 according to an embodiment.

The base station 1500 is a base station of a mobile communication system comprising a relay station and a plurality of mobile stations.

The base station 1500 comprises a coder 1501 configured to generate a codeword from each payload of a plurality of payloads, wherein each payload contains data to be transmitted to a mobile station of a plurality of mobile stations.

The base station 1500 further comprises a codeword allocation circuit 1502 configured to allocate communication resources separated in at least one of frequency and time for the codewords generated by the coder 1502.

The base station 1500 further comprises a sender 1503 configured to send the codewords to the relay station.

Figure 16:
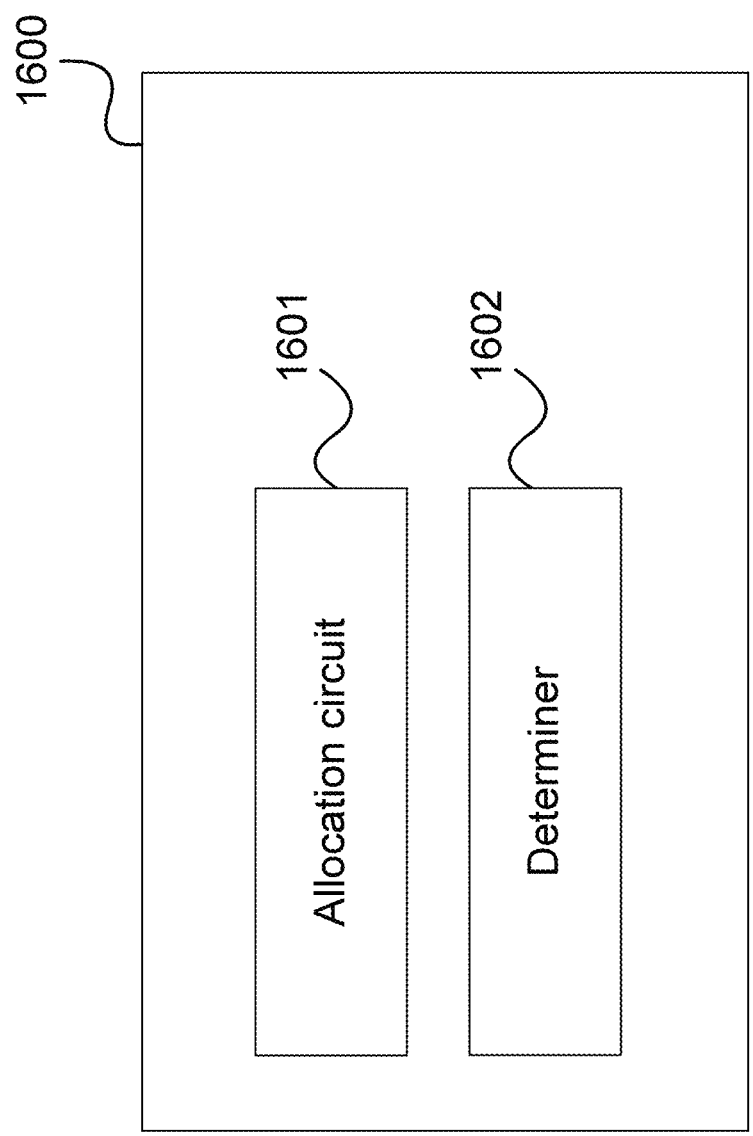
FIG. 16 shows a network component of a mobile communication network according to an embodiment.

According to one embodiment, a network component is provided as illustrated in FIG. 16.

FIG. 16 shows a network component 1600 of a mobile communication network according to an embodiment.

The network component 1600 is a network component of a mobile communication network operating a radio cell, wherein the radio cell comprises a plurality of radio cell sectors.

The network component 1600 comprises a determiner 1601 configured to determine, for each radio cell sector of the plurality of radio cell sectors, the amount of radio communication resources to be allocated to the radio cell sector based on a predetermined allocation criterion.

The network component 1600 further comprises an allocation circuit 1602 configured to allocate, for each radio cell sector of the plurality of radio cell sectors, the determined amount of radio resources.

According to one embodiment, in other words, sub-bands (i.e. frequency regions) of variable sizes are allocated to the radio cell sectors.

According to one embodiment, the determiner is configured to allocate a different amount of radio resources to a first radio cell sector and to a second cell sector according to a predetermined allocation criterion.

According to one embodiment, the determiner is configured to dynamically determine the amount of radio resources and the allocation circuit is configured to dynamically allocate the determined amount of radio resources.

For example, in reaction to the occurrence of any event that has an effect on the variables on which the predetermined allocation criterion operates, the determiner is configured to determine the amount of radio resources to allocate and the allocation circuit is configured to allocate the determined amount of radio resources.

The determiner is for example configured to periodically determine the amount of radio resources and the allocation circuit is configured to periodically allocate the determined amount of radio resources.

According to one embodiment, the allocation criterion is based on the maximization of a utility function or the satisfaction of a set of policies.

The radio resources are for example radio frequencies or radio frequency bands.

Figure 17:
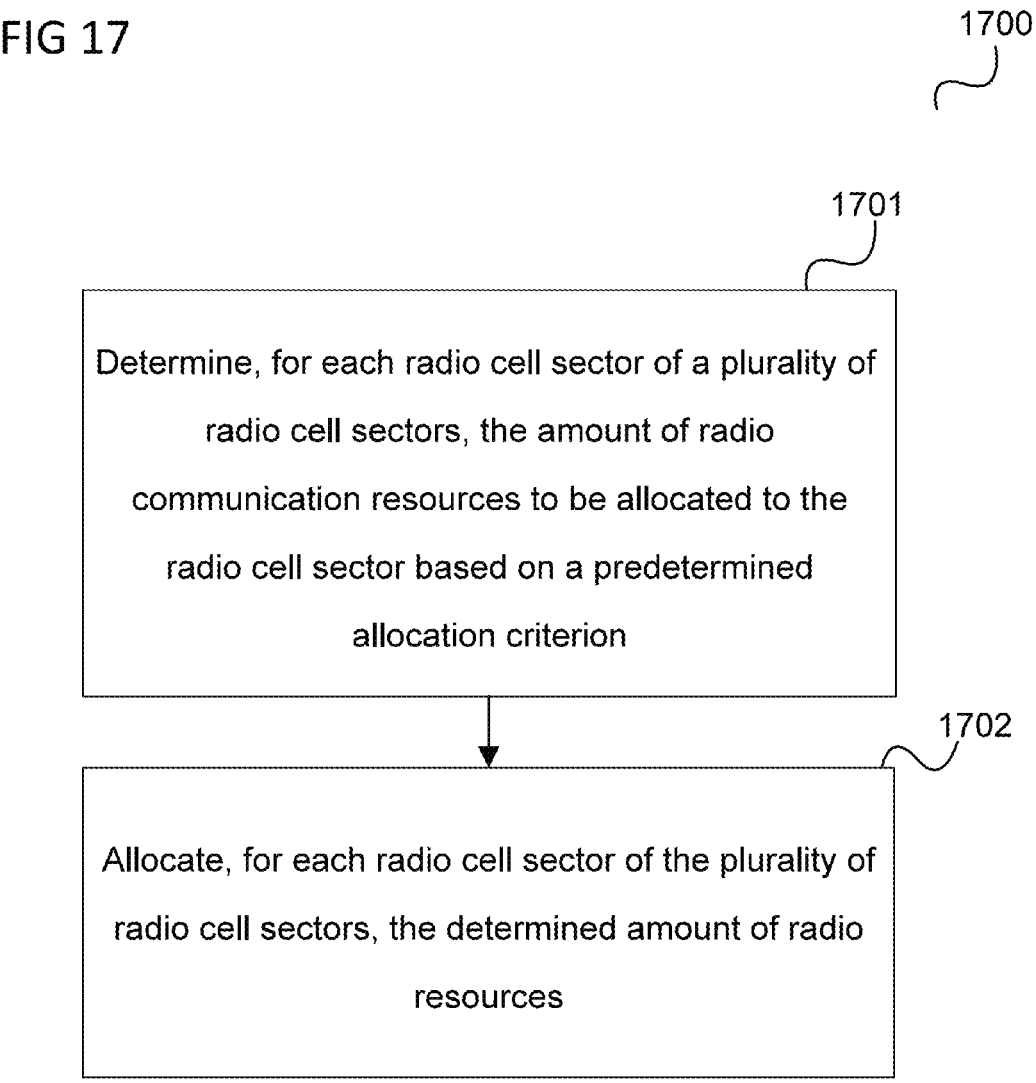
FIG. 17 shows a flow diagram according to an embodiment.

The network component 1600 for example carries out a method as illustrated in FIG. 17.

FIG. 17 shows a flow diagram 1700 according to an embodiment.

The flow diagram 1700 illustrates a method for radio resource allocation in a mobile communication network operating a radio cell comprising a plurality of radio cell sectors.

In 1701, for each radio cell sector of the plurality of radio cell sectors, the amount of radio communication resources to be allocated to the radio cell sector is determined based on a predetermined allocation criterion.

In 1702, for each radio cell sector of the plurality of radio cell sectors, the determined amount of radio resources is allocated.

It should be noted that embodiments described in context of one of the devices or methods described above with reference to the FIGS. 3 to 17 are analogously valid for the other devices and methods.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the following, embodiments of the devices and methods described above with reference to FIGS. 3 to 17 are described with reference to a scenario with (high capacity) links between base stations and a scenario without (high capacity) links between base stations.

Figure 18:
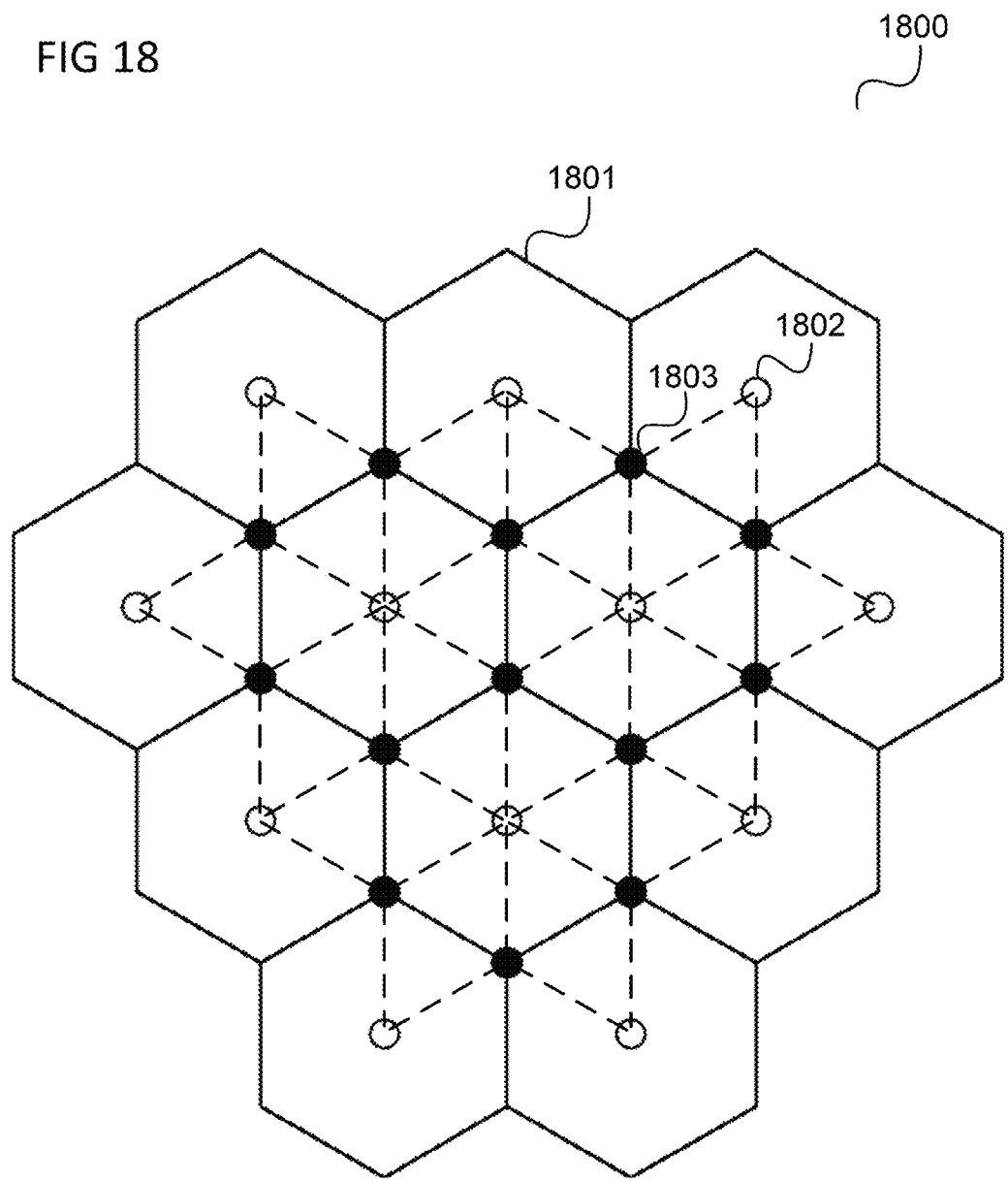
FIG. 18 shows a communication arrangement according to an embodiment.

A communication arrangement without (high capacity) links between the base stations is shown in FIG. 18.

FIG. 18 shows a communication arrangement 1800 according to an embodiment.

The communication arrangement 1800 comprises a plurality of radio cells 1801 for example corresponding to the radio cells 104 which are each operated by a base station 1802 for example corresponding to the base stations 103. In this example, a (3, 6)-scenario is assumed such that each base station 1802 has 6 associated relay stations 1803 (shown as solid circles) such that each relay station 1803 is associated with 3 base stations 1803. It should be noted that in the illustration of FIG. 18, only for the three inner base stations 1802 six associated relay nodes are shown but this may extended accordingly for all other base stations 1802. It should be noted that a relay node 1803 is connected to all its associated base station 1803, e.g. by means of a radio link.

It should further be noted that other configurations than (3, 6)-relaying may be used according to various embodiments.

Communication terminals (not shown), e.g. corresponding to communication terminal 105 may be located within the radio cells 1801.

Figure 19:
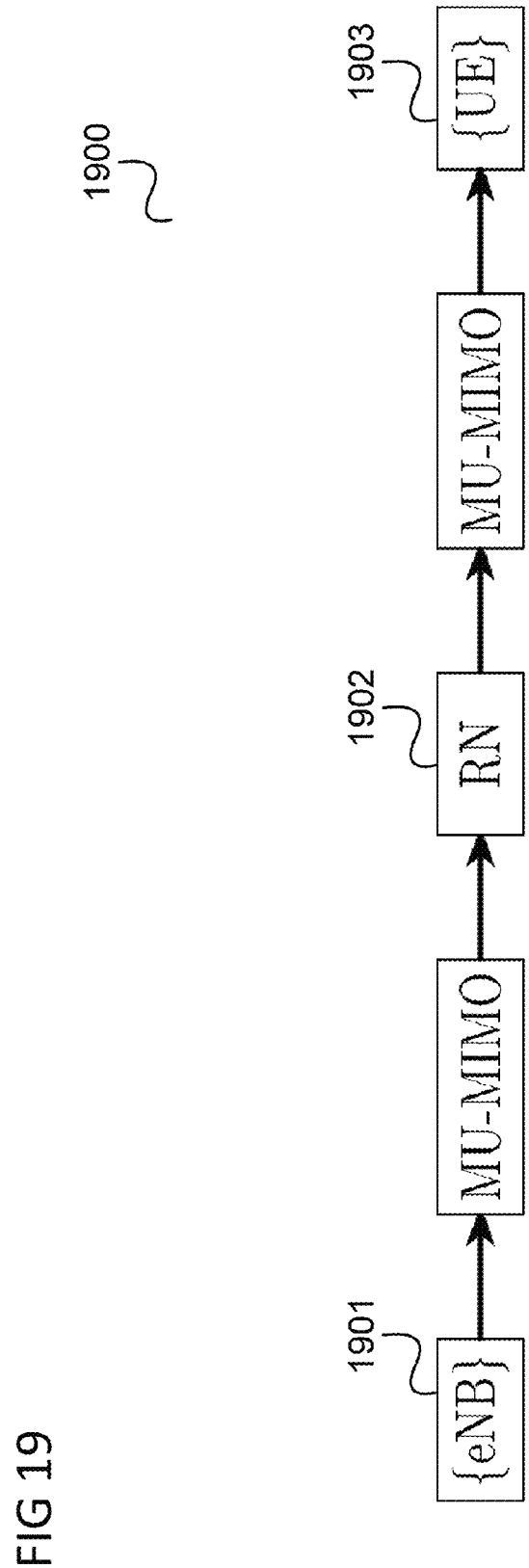
FIG. 19 shows a data flow diagram according to an embodiment.

The data flow from the base stations 1802 to the relay nodes 1803 is illustrated in FIG. 19.

FIG. 19 shows a data flow diagram 1900 according to an embodiment.

The data flow diagram 1900 illustrates the flow of data in downlink and involves a set of base stations 1901 corresponding to one or more of the base stations 1802, a relay node 1902 associated with the base stations 1901 and corresponding to one of the relay nodes 1803 and a set of communication terminals 1903 corresponding to one or more of the communication terminals located in the radio cells 1801.

In this embodiment, for relaying, the half-duplex 2 (time) slots model is used. In the first slot of a pair of time slots, the base stations 1901 transmits to the associated relay node 1902 without any form of cooperation. The relay node 1902 then resolves the each data stream by means of spatial demultiplexing and successive interference cancellation. During the second slot, the relay node 1902 forwards the information received in the first slot to the communication terminals 1902 using interference reduction techniques. This for example involves beamforming plus a form of precoding, e.g. codebook precoding, dirty paper coding, etc.

The transmission from the base stations 1802 to the associated relay stations 1803 can be seen to be carried out in accordance with multi-user multiple-input multiple-output (MU-MIMO) in this embodiment.

Figure 20:
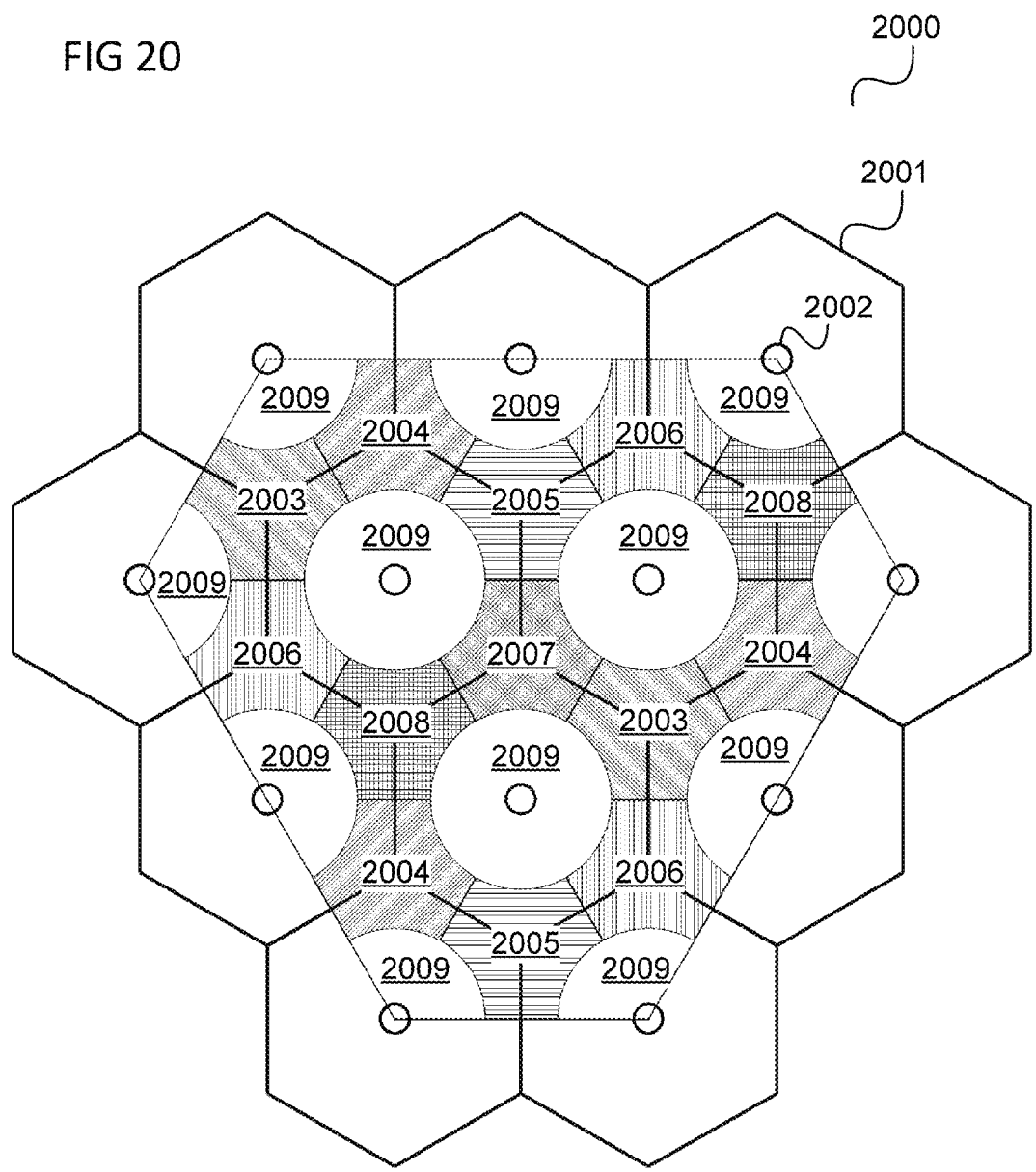
FIG. 20 shows a frequency allocation diagram according to an embodiment.

According to one embodiment, for both slots, a hybrid frequency reuse pattern is used as illustrated in FIG. 20.

FIG. 20 shows a frequency allocation diagram 2000 according to an embodiment.

The frequency allocation diagram 2000 shows the frequency allocation for a communication arrangement including a plurality of radio cells 2001 wherein each radio cell 2001 is operated by a base station 2002 as described with reference to FIG. 18.

Circular areas 2009 indicate zones around the base stations 2002 in which the communication channel used for the communication between the base stations 2002 and the communication terminals (not shown) uses a single subband. Hatched areas 2003 to 2008 indicate zones in which the communication channel (i.e. the overall available communication resources) is partitioned according to a frequency reuse factor equal to ⅙. This means that hatched areas 2003 to 2008 having a different hatching use different radio frequency resources for communication while hatched areas 2003 to 2008 having the same hatching (as indicated by the same reference numeral) use the same radio frequency resources. It should be noted that different amounts of radio resources (e.g. in terms of numbers of resource blocks or sub-carriers) may be assigned to the hatched areas 2003 to 2008 (and the circular area 2009) and these amounts may dynamically change. This can be seen to correspond to the network component and the method described above with reference to FIGS. 16 and 17.

According to one embodiment, the frequency use pattern is periodically permuted so that there is a fair redistribution of the channel properties. This is illustrated in FIG. 21.

Figure 21:
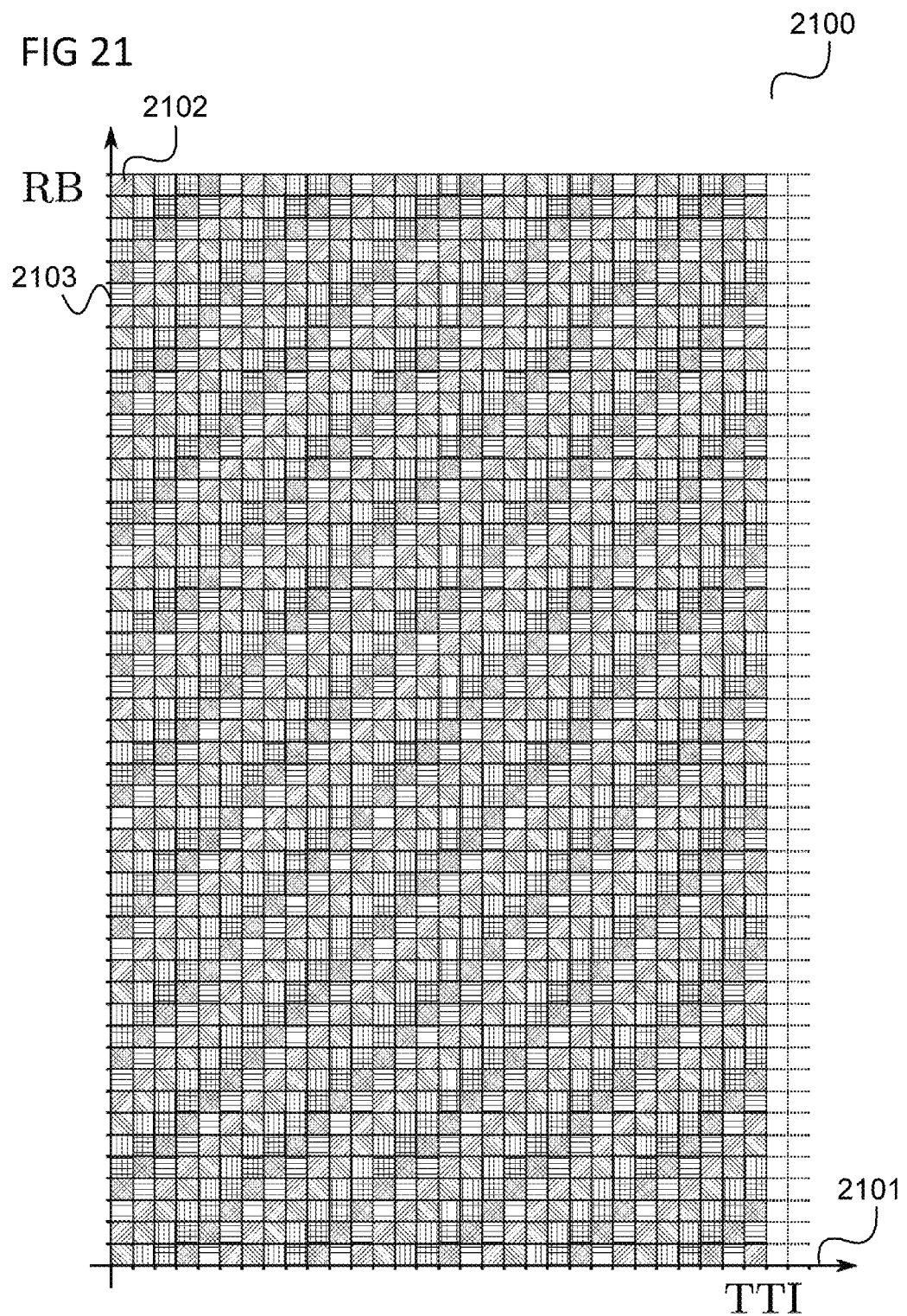
FIG. 21 shows a frequency resource allocation diagram.

FIG. 21 shows a frequency resource allocation diagram 2100.

In the frequency resource allocation diagram 2100, the frequency resource allocation is shown over time increasing in direction of a time axis 2100 in terms of time transmission intervals (TTIs). The frequency ranges allocated to the different hatched areas 2003 to 2008 are shown along a frequency axis 2102 in terms of frequency ranges corresponding to resource blocks (RBs) 2103. The hatched area 2003 to 2008 to which a resource block 2103 is allocated is indicated by the corresponding hatching. As can be seen, the allocation of the resource blocks to the hatched areas 2003 to 2008 permutes over time such that in average, each resource block is allocated to each hatched area 2003 to 2008 for a similar total period of time.

According to an embodiment, a communication terminal that is closer to its reference base station 2002 (e.g. its nearest base station 2002 and/or the base station 2002 with which it is registered and/or which operates the radio cell 2001 in which the communication terminal is located) than a threshold T1 is served by the (uncooperative) base stations 2002 while a communication terminal that is further from its reference base station than T1 (or exactly at T1 from its reference base station) is served employing (m,n)-relaying, which is enforced through a feedback link that goes from the corresponding relay node 2003 (e.g. the relay node 2003 closest to the communication terminal) to the base stations 2002 associated with the relay station 2003. It should be noted that this results in areas around the base stations 2002 in which the communication terminals are served by the base stations 2002 themselves and that correspond to the circular areas 2009.

The decision whether a communication terminal is served via a relay station 2003 or directly via a base station 2002 based on the distance to the base station 2002 may be seen to correspond to the communication system described above with reference to FIG. 3.

Figure 22:
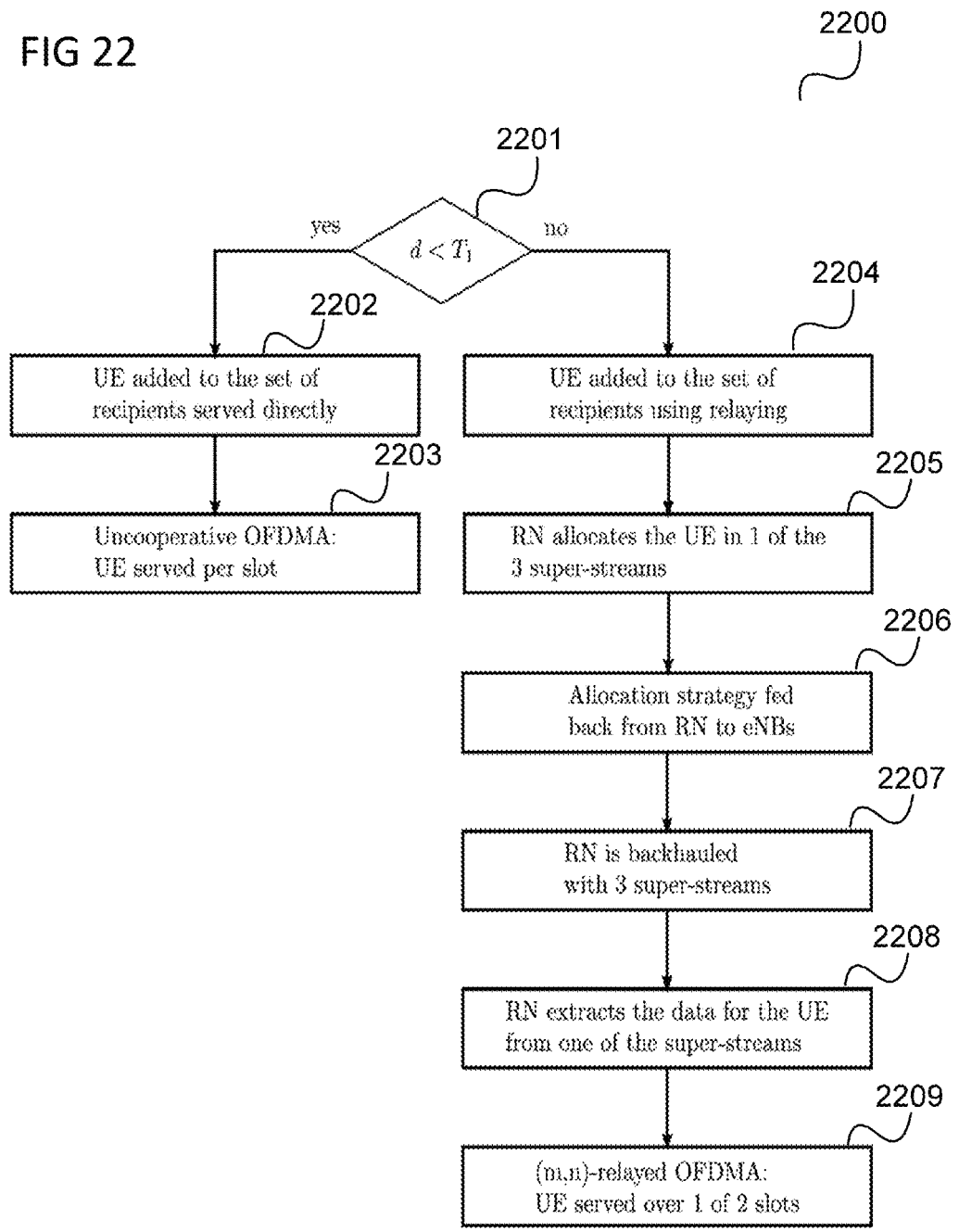
FIG. 22 shows a flow diagram according to an embodiment.

The flow carried out by a communication system according to one embodiment, in this example comprising the communication arrangement 2000, is illustrated in FIG. 22.

FIG. 22 shows a flow diagram 2200 according to an embodiment.

The flow diagram illustrates the flow carried out when a communication terminal, e.g. corresponding to the communication terminal 105, intends to communicate via the radio access network of the communication system, e.g. the radio access network 101.

In 2201, it is decided whether the distance of the communication terminal from its reference base station d is below the threshold T1. If the distance is below T1, the communication terminal is in 2202 added to the set of recipients (i.e. communication terminals) that are served directly (i.e. without intermediate relay node) by the base stations 2002.

In 2203, the communication terminal is then for example served per slot in accordance with uncooperative OFDMA.

If the distance is not below T1, the communication terminal is in 2204 added to the set of recipients (i.e. communication terminals) that are served via a relay node 2003, i.e. is served using (m, n)-relaying.

According to one embodiment, when the communication network operates in (m,n)-relayed mode, part of the intelligence for the communication resource allocation can be seen to be moved to the respective relay node 1803. The relay node for example determines a communication resource allocation strategy and/or communication resource allocation that is then fed back to its associated base stations 1802, which implement the determined communication resource allocation jointly with the communication resource allocation for the circular areas 2009, i.e. they take the relay allocation into account for the radio resource allocation pertaining to the areas served directly by themselves without usage of relay nodes.

The joint implementation of the radio resource allocations imposes that each relay node is made aware of the recipients to be served in the circular areas 2009 it influences (in terms of communication resource allocation) and that such recipients are then served over those communication resources that are on purpose left unused by the relay node.

According to one embodiment, specifically, the relay node 1803 assigns the communication terminal to one of three super-streams in 2205.

According to various embodiments, two different strategies may be used for the creation of the super-streams. This is illustrated in FIG. 23.

Figure 23:
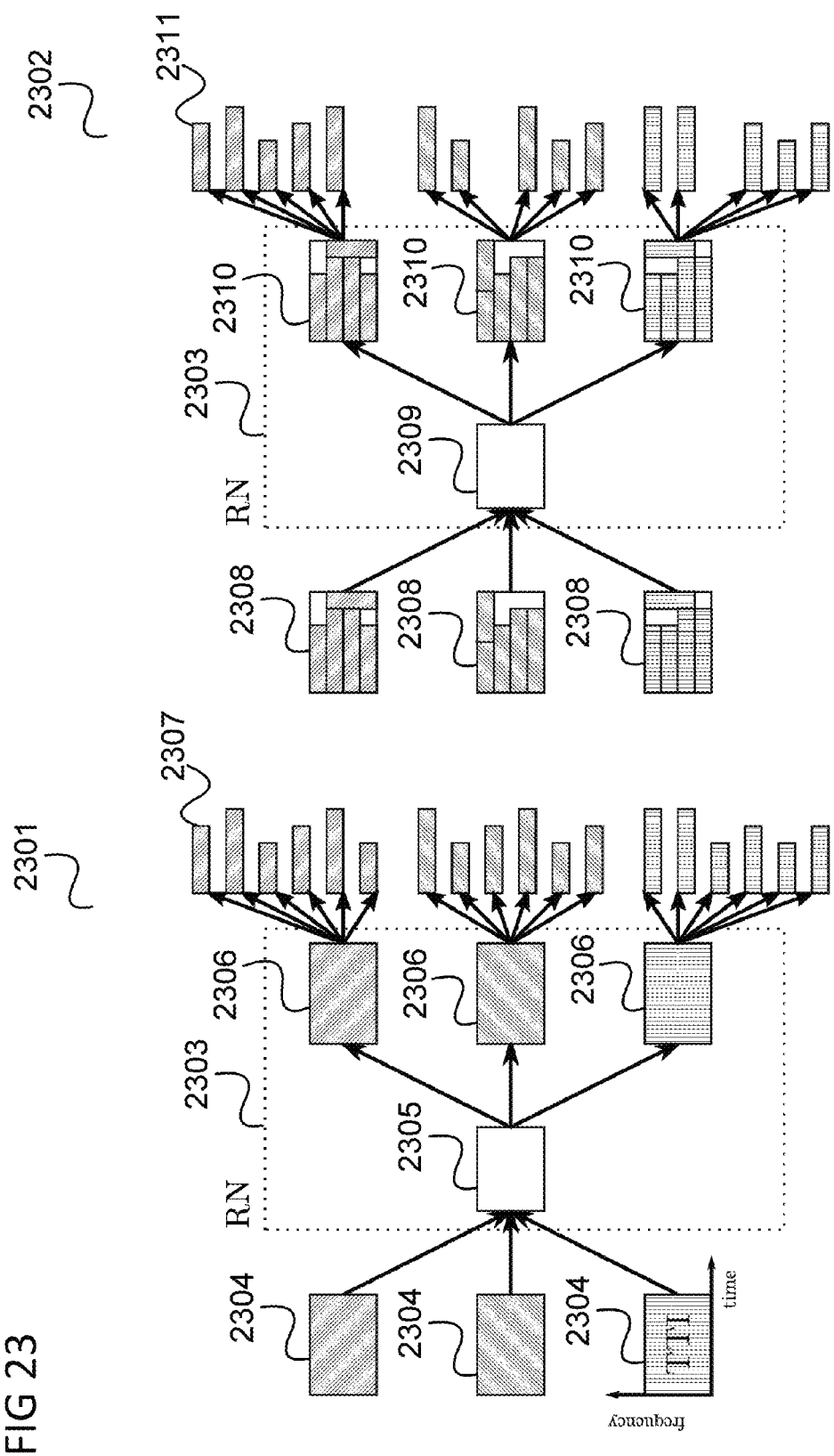
FIG. 23 shows a first data flow diagram and a second data flow diagram.

FIG. 23 shows a first data flow diagram 2301 and a second data flow diagram 2302.

The data flow diagrams 2301, 2302 illustrate the reception of data and sending of data by a relay station (or relay node) 2303 corresponding to one of the relay stations 1803.

In accordance with the strategy illustrated in the first data flow diagram 2301, the relay node 2303 receives super-streams 2304 from each of the three base stations 1802 associated with the relay node 2303 (in accordance with the (3, 6)-relaying in this example) wherein the data for all users (i.e. communication terminals) to be served by the relay node 2303 are merged and transmitted over super-code-words as illustrated by the super-streams 2304 being shown solid (to indicate that the data for different communication terminals is homogenously distributed over the communication resources, i.e. time and frequency). It should be noted that the super-streams 2304 may be transmitted using identical communication resources.

The relay node 2303 separates (repacks) the overall received data 2305 into data portions 2306 corresponding to the different base stations 1802 which it then each separates into data streams 2307 to be sent to the different communication terminals. It should be noted that the data streams 2307 may be transmitted using identical communication resources.

In accordance with the strategy illustrated in the second data flow diagram 2302, the relay node 2303 receives super-streams 2308 from each of the three base stations 1802 associated with the relay node 2303. In contrast to the super-streams 2304 used according to the strategy illustrated in the first data flow diagram 2301, the data for the communication terminals are kept separated in the super-streams 2308 by time and frequency multiplexing as indicated by the separate blocks within the illustration of the super-streams 2308. It should be noted that the super-streams 2308 may be transmitted using identical communication resources.

The relay node 2303 separates (repacks) the overall received data 2309 into data portions 2310 corresponding to the different base stations 1802 which it then each separates into data streams 2311 to be sent to the different communication terminals. It should be noted that the data streams 2311 may be transmitted using identical communication resources.

It should be noted that the usage of super-streams 2304, 2308 and specifically the extraction of the data portions 2306, 2310 and the data streams 2307, 2311 to be sent to the different communication terminals from the overall received data 2305, 2306 can be seen to correspond to the relay station and the method described above with reference to FIGS. 12 and 13.

According to one embodiment the technique illustrated in the first data flow diagram 2301 is preferred from a performances point of view.

Once the super-streams 2304, 2308 are created, they can be allocated in the available sub-band (i.e. the available radio resources according to the allocation illustrated in FIG. 20) letting each base station use the whole sub-band or enforcing a predetermined orthogonal allocation pattern, i.e. allocating one of a plurality of orthogonal portions of the sub-band (e.g. in terms of different OFDMA sub-carriers) for each super-stream 2304, 2308. For the latter case, according to one embodiment, cyclic patterns that periodically permute the assignment of each orthogonal portion of the sub-band to the super-streams 2304, 2308 may be used or the relay node 2303 may itself feedback adaptive orthogonal assignments to its associated base stations. The allocation of the whole sub-band may for example be used as the default option while the usage of the orthogonal allocation patterns may be reserved for the case in which each base station is scarcely loaded and needs to transmit only in small portions of the aforementioned sub-band.

It should be noted that, as illustrated in FIG. 21, the available sub-band does not have to made up of contiguous communication resources, but may include the radio frequency regions corresponding to different resource blocks that do not have to be adjacent in terms of their frequency ranges.

After the communication terminal has been allocated to one of the super-streams 2304, 2308 by the relay node 1803, i.e. the relay node 1803 has determined which super-stream 2304, 2308 is most convenient for transferring the data to be sent to the communication terminal, the relay node 1803 signals this allocation (and, for example also the allocation strategy for the sub-carriers to the available sub-band) to its associated base stations 1802 in 2206.

In 2207, the base stations 1802 transmit the super-streams 2304, 2308 including the data to be forwarded to the communication terminals served by the relay node 1803 to the relay node 1803. The transmission of data to be forwarded to the communication terminals served by the relay node 1803 to the relay node 1803 is also referred to as backhauling the relay node 1803.

In 2208, as illustrated in FIG. 23, the relay node 1803 extracts the data to be sent to the communication terminal from the data received via the super-streams 2304, 2308.

In 2209, the relay node 1803 transmits the data to be sent to the communication terminal via one of the two slots to the communication terminal. Overall, the communication terminal is thus served in accordance with (m, n)-relayed OFDMA, in this example (3, 6)-relayed OFDMA.

It can be seen from simulations that deploying the relay nodes 1803 so that they are in line of sight (LOS) with respect to the serving base stations (i.e. their associated base stations) and not in line of sight with respect to their interfering (i.e. not associated) base stations, the network throughput achieved by such a kind of (m, n)-relaying infrastructure, which requires no interconnection between the base stations, is comparable with that attainable by CoMP. This infrastructure can however be provided at significantly lower deployment costs since instead of high capacity base station interconnections only an additional feedback link between the relay stations 1903 and their associated base stations 1802 is required and this can be implemented by means of a low cost radio link.

In the following, embodiments of the devices and methods described above with reference to FIGS. 3 to 17 are described with reference to a scenario with (high capacity) links between base stations.

Figure 24:
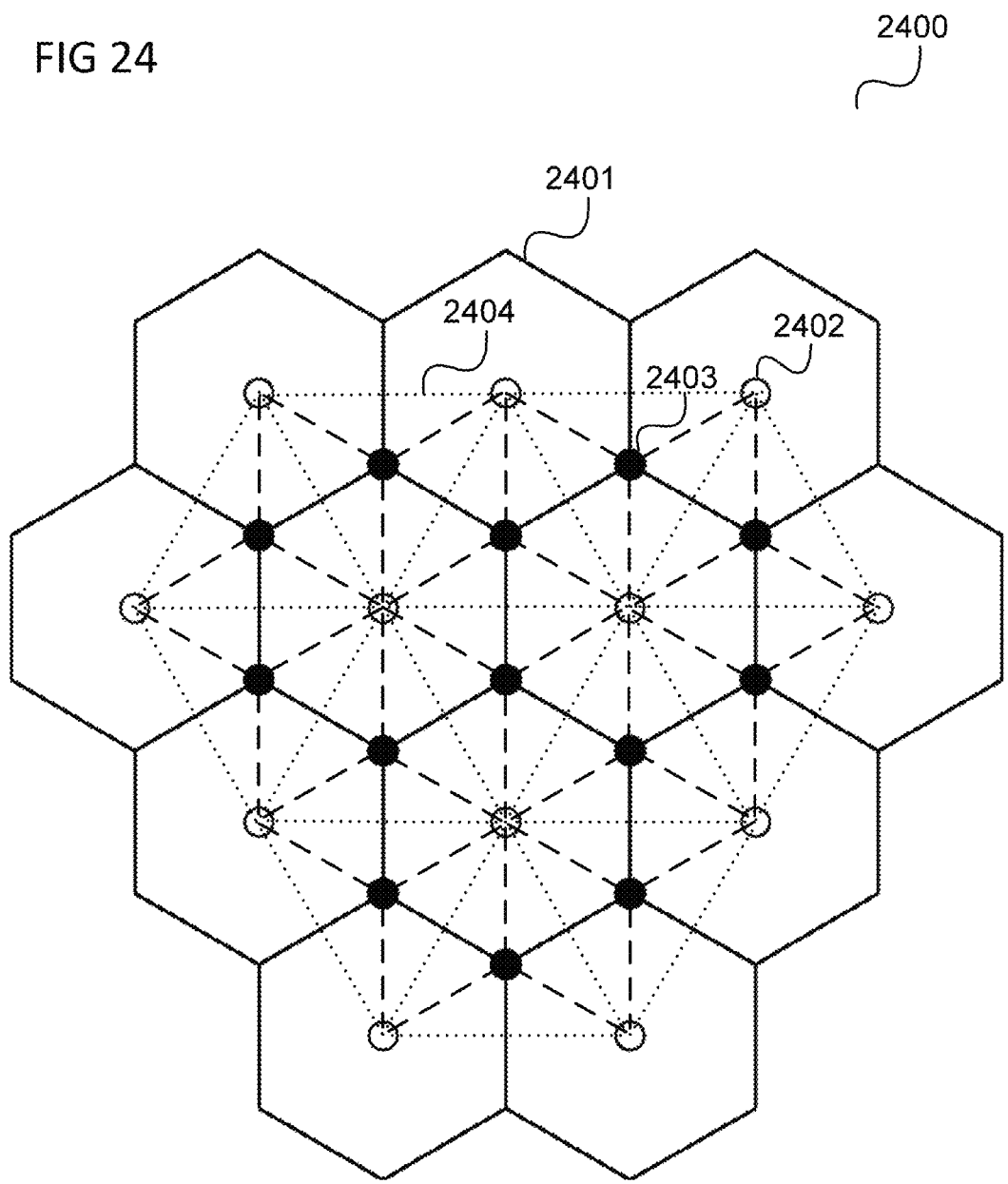
FIG. 24 shows a communication arrangement according to an embodiment.

A communication arrangement with (high capacity) links between the base stations is shown in FIG. 24.

FIG. 24 shows a communication arrangement 2400 according to an embodiment.

The communication arrangement 2400 comprises a plurality of radio cells 2401, for example corresponding to the radio cells 104, which are each operated by a base station 2402, for example corresponding to the base stations 103. In this example, a (3, 6)-scenario is assumed such that each base station 2402 has 6 associated relay stations 2403 (shown as solid circles) and such that each relay station 2403 is associated with 3 base stations 2403. It should be noted that in the illustration of FIG. 24, only for the three inner base stations 2402 six associated relay nodes are shown but this may extended accordingly for all other base stations 2402.

In contrast to the communication arrangement 1800 shown in FIG. 18, the base stations 2402 are connected via (high capacity) links 2404.

It should further be noted that other configurations than (3, 6)-relaying may be used according to various embodiments, e.g. (3, 18)-relaying.

Communication terminals (not shown), e.g. corresponding to communication terminal 105 may be located within the radio cells 2401.

Figure 25:
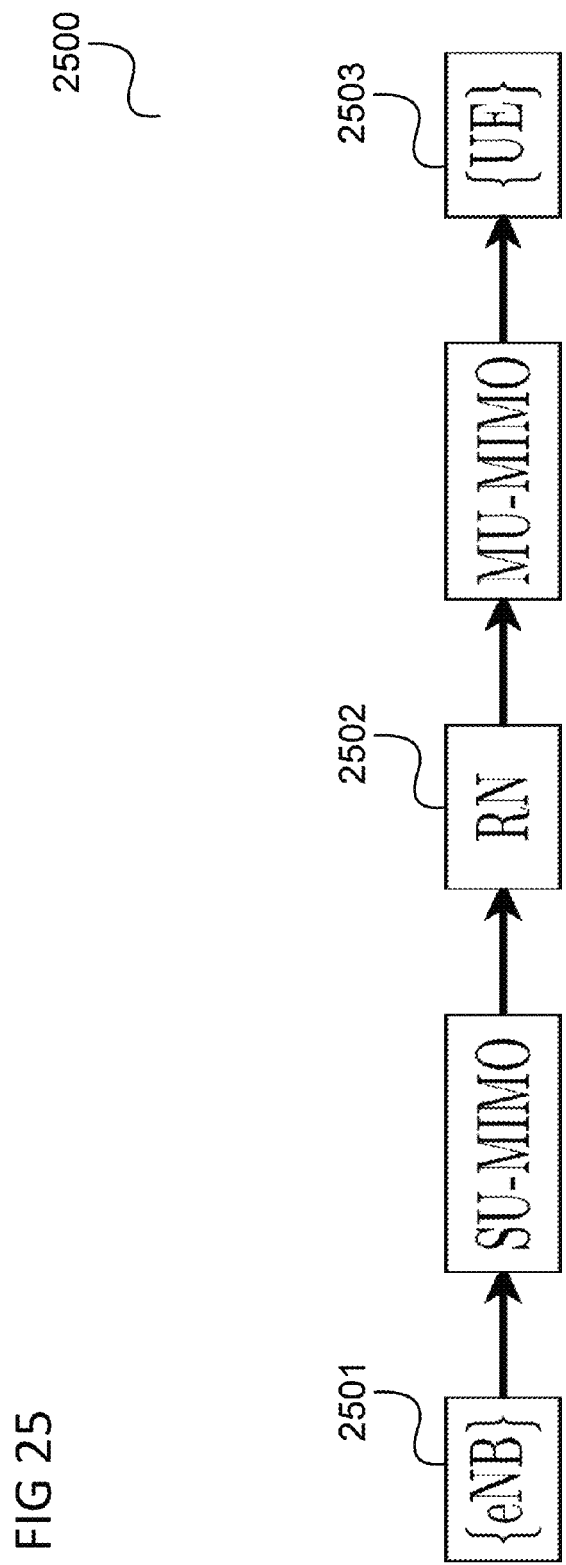
FIG. 25 shows a data flow diagram according to an embodiment.

The data flow from the base stations 2402 to the relay nodes 2403 is illustrated in FIG. 25.

FIG. 25 shows a data flow diagram 2500 according to an embodiment.

The data flow diagram 2500 illustrates the flow of data in downlink and involves a set of base stations 2501 corresponding to one or more of the base stations 2402, a relay node 2502 associated with the set of base stations 2501 and corresponding to one of the relay nodes 2403 and a set of communication terminals 2503 corresponding to one or more of the communication terminals located in the radio cells 2401.

According to one embodiment, the presence of the eNB-eNB links is exploited to reduce the cost of the relay nodes 2403. The presence of the links between the cooperating eNBs 2402 allows to treat a cooperative set of base stations 2402 as a single transmitter. Thus, the base stations 2402 associated with the relay node 2502 can use single user MIMIO (SU-MIMO) instead of MU-MIMO (as illustrated in FIG. 19) to transmit the data to be forwarded to the communication terminals served by the relay node 2502. Thus, the relay node 2502 can be equipped with a cheaper receiver compared to the transmission of the data to the relay node 2502 in accordance with MU-MIMO. For example, a MMSE-SIC (Minimum Mean Square Error-Successive Interference Cancellation) receiver needed to access a MU-MIMO multiple access channel can be replaced by a cheaper MMSE receiver.

The transmission of the data to be forwarded from the relay node 2502 to the communication terminals 2503 is in this embodiment carried out in accordance with MU-MIMO.

It should be noted that the transmission of the data to be forwarded from the base stations 2402 to the relay stations 2403 in accordance with SU-MIMO can be seen as corresponding to the mobile communication network, the method for relaying data and the relay station described above with in FIGS. 9, 10 and 11.

According to one embodiment, for both slots, a baseline frequency reuse pattern is used as illustrated in FIG. 25.

Figure 26:
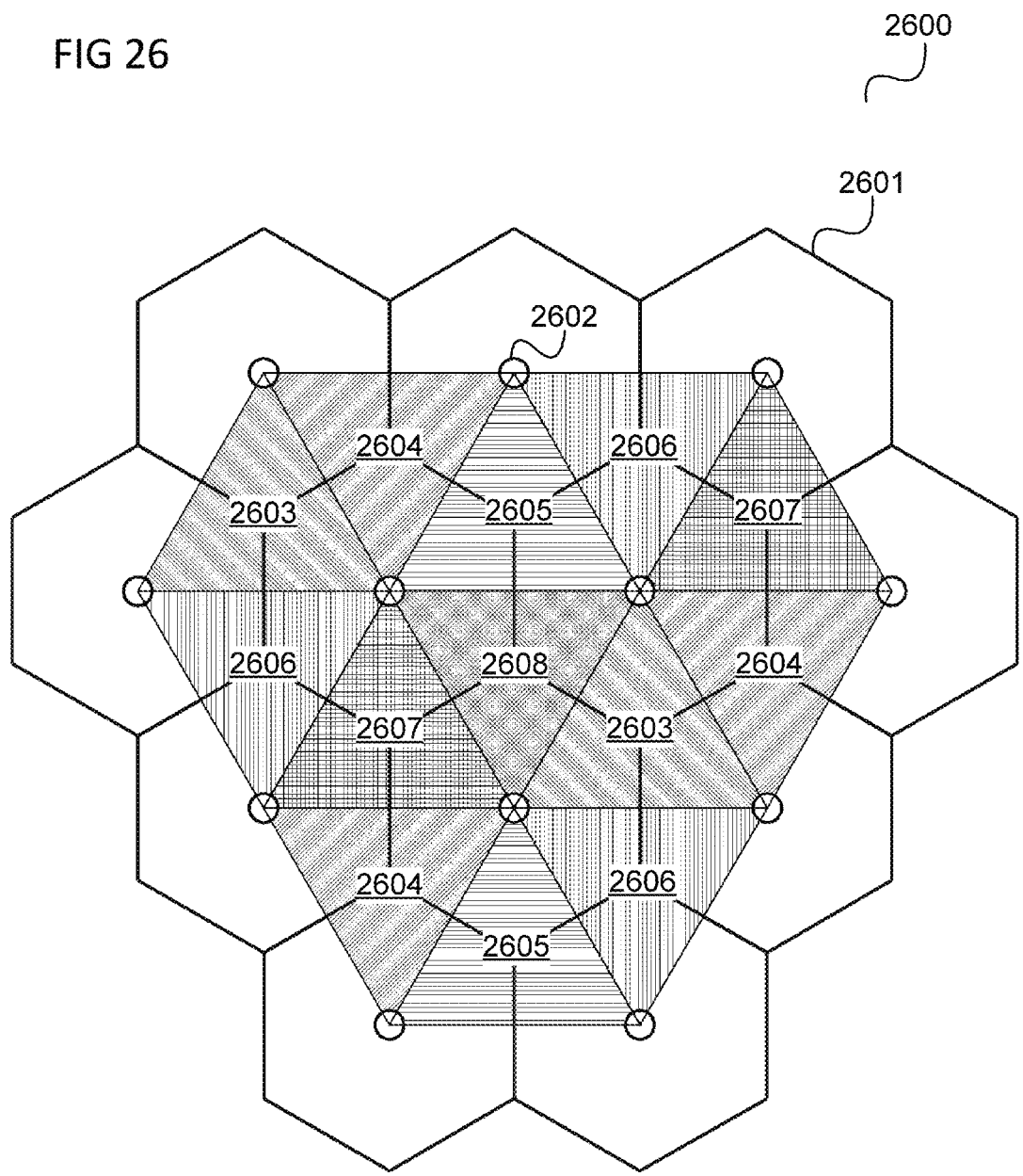
FIG. 26 shows a frequency allocation diagram according to an embodiment.

FIG. 26 shows a frequency allocation diagram 2600 according to an embodiment.

The frequency allocation diagram 2600 shows the frequency allocation for a communication arrangement including a plurality of radio cells 2401 wherein each radio cell 2401 is operated by a base station 2402 as described with reference to FIG. 24.

Hatched areas 2603 to 2608 indicate zones in which the communication channel is partitioned according to a frequency reuse factor equal to ⅙. This means that hatched areas 2603 to 2608 having a different hatching use different radio frequency resources for communication while areas 2603 to 2608 having the same hatching (as indicated by the same reference numeral) use the same radio frequency resources.

It should be noted that different amounts of radio resources (e.g. in terms of numbers of resource blocks or sub-carriers) may be assigned to the hatched areas 2603 to 2608 and these amounts may dynamically change. This can be seen to correspond to the network component and the method described above with reference to FIGS. 16 and 17.

In one embodiment, there are no constraints on the frequency hopping structure, i.e. the communication system adapts dynamically to the radio environment and may respond with anisotropic distributions of the radio communication resources.

It should be noted that when using the relaying chain as illustrated in FIG. 25 (in contrast to the relaying chain illustrated in FIG. 19), according to one embodiment, the usage of CoMP and (m,n)-relaying results in a radio allocation that is homogeneous in how the channel (i.e. the overall communication resources) is partitioned into subbands. This allows to use a baseline frequency reuse pattern that does not show areas dedicated to one of CoMP and (m,n)-relaying rather than the other.

According to an embodiment, a communication terminal that is closer to its reference base station 2402 (e.g. its nearest base station 2402 and/or the base station 2402 with which it is registered and/or which operates the radio cell 2401 in which the communication terminal is located) than a threshold T2 is served by the base stations 2402 according to CoMP (i.e. by cooperative base stations 2402) while a communication terminal that is further from its reference base station than T2 (or exactly at T2 from its reference base station) is served employing (m,n)-relaying, which is enforced through a feedback link that goes from the corresponding relay node 2403 (e.g. the relay node 2403 closest to the communication terminal) to the base stations 2402 associated with the relay station 2403.

The decision whether a communication terminal is served via a relay station 2403 or directly via a base station 2402 based on the distance to the base station 2402 may be seen to correspond to the communication system described above with reference to FIG. 3.

Figure 27:
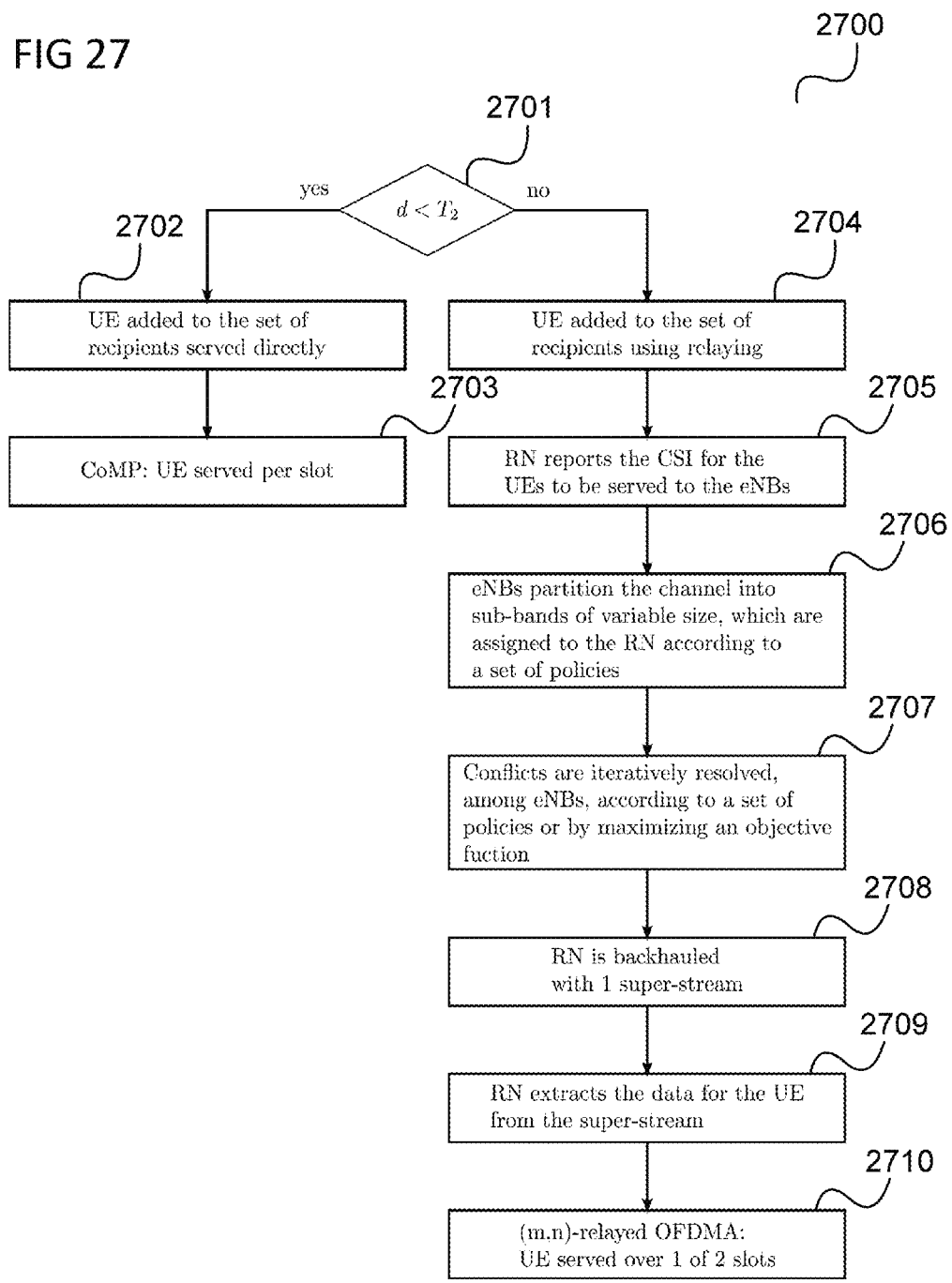
FIG. 27 shows a flow diagram according to an embodiment.

The flow carried out by a communication system according to one embodiment, in this example comprising the communication arrangement 2400, is illustrated in FIG. 27.

FIG. 27 shows a flow diagram 2700 according to an embodiment.

The flow diagram 2700 illustrates the flow carried out when a communication terminal, e.g. corresponding to the communication terminal 105, intends to communicate via the radio access network of the communication system, e.g. the radio access network 101.

In 2701, it is decided whether the distance of the communication terminal from its reference base station d is below the threshold T2. If the distance is below T2, the communication terminal is in 2702 added to the set of recipients (i.e. communication terminals) that is served directly (i.e. without intermediate relay node) by the base stations 2702.

In 2703, the communication terminal is then for example served per slot in accordance with CoMP.

If the distance is not below T2, the communication terminal is in 2704 added to the set of recipients (i.e. communication terminals) that is served via a relay node 2403, i.e. is served using (m, n)-relaying.

In 2705, the relay node 2403 serving the communication terminal reports the CSI (Channel State Information) for the communication terminal to its associated base stations 2402.

According to one embodiment, the intelligence necessary for the resource block allocation in this case is, compared to the example described with reference to FIG. 18, moved back to the base stations 2402. This allows the base stations 2402 to perform conflict resolution.

In 2706, the base stations 2402 partition the channel (i.e. the available communication resources) into sub-bands of variable size that are assigned to the various relay nodes 2403, e.g. according to a certain allocation policies.

In 2707, conflicts are iteratively resolved among the base stations 2402 according to a set of policies or maximizing an objective function.

In 2708, the relay node serving the communication terminal is backhauled with a super-stream. The usage of a super-stream for data transmission from the base stations 2402 to the relay nodes 2403 is illustrated in FIG. 28.

Figure 28:
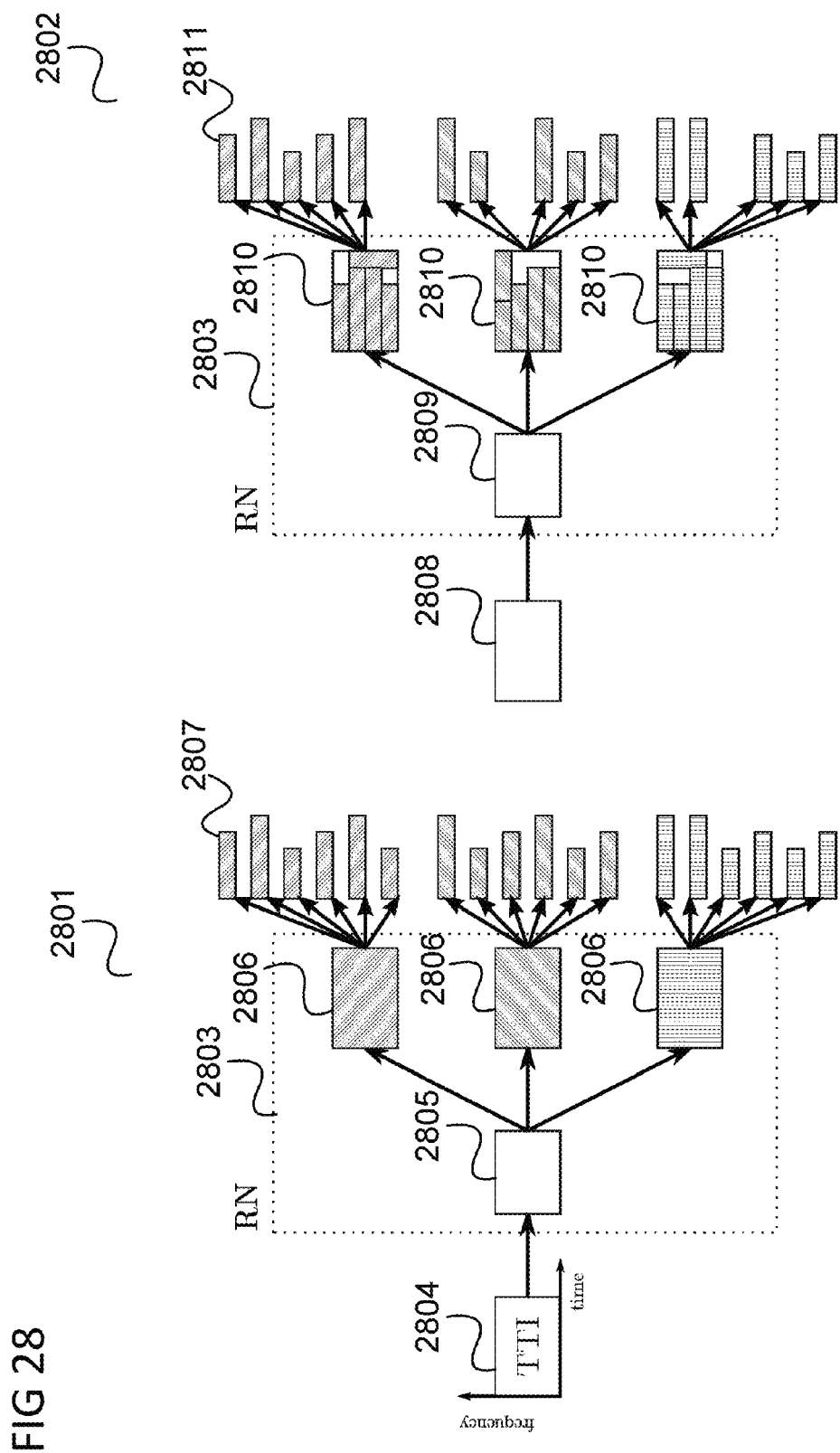
FIG. 28 shows a first data flow diagram and a second data flow diagram.

FIG. 28 shows a first data flow diagram 2801 and a second data flow diagram 2802.

The data flow diagrams 2801, 2802 illustrate the reception of data and sending of data by a relay station (or relay node) 2803 corresponding to one of the relay stations 2403. The approaches according to the data flow diagrams 2801, 2802 may be seen to be similar to the approaches described with reference to FIG. 23.

In accordance with the strategy illustrated in the first data flow diagram 2801, the relay node 2803 receives a super-stream 2804 via SU-MIMO from the three base stations 2402 associated with the relay node 28303 (in accordance with the (3, 6)-relaying in this example) wherein the data for all users (i.e. communication terminals) to be served by the relay node 2803 are merged and transmitted over super-codewords. The relay node 2803 separates (repacks) the overall received data 2805 into data portions 2806 corresponding to the different base stations 2402, which are then further separated into data streams 2807 to be sent to the different communication terminals. It should be noted that the data streams 2807 may be transmitted using identical communication resources.

In accordance with the strategy illustrated in the second data flow diagram 2802, the relay node 2803 receives a super-stream 2808 from the three base stations 2402 associated with the relay node 2803. In contrast to the super-stream 2804 used according to the strategy illustrated in the first data flow diagram 2801, the data for the communication terminals are now kept separated in the super-streams 2808 by time and frequency multiplexing. The relay node 2803 separates (repacks) the overall received data 2809 into data portions 2810 corresponding to the different base stations 2402, which it then separates into the data streams 2811 to be sent to the different communication terminals. It should be noted that the data streams 2811 may be transmitted using identical communication resources.

It should be noted that the usage of the super-streams 2804, 2808 and specifically the extraction of the data portions 2806, 2810 and the data streams 2807, 2811 to be sent to the different communication terminals from the overall received data 2805, 2806 can be seen to correspond to the relay station and the method described above with reference to FIGS. 12 and 13.

In 2709, the relay node serving the communication terminal extracts the data to be forwarded to the communication terminal from the received super-stream.

In 2710, the relay node serves the communication terminal over 1 of 2 slots such that overall the communication terminal is served in accordance with (m, n)-relayed OFDMA.

By simulations, it can be shown that deploying the relay nodes 2402 so that they are in line of sight with respect to their serving base stations and not in line of sight with respect to their interfering base stations, the achievable network throughput for an embodiment as described with reference to FIGS. 24 to 28 can surpass that attainable by a communication system using (only) CoMP. Using (m,n)-relaying jointly with CoMP further allows reducing the traffic in the eNB-eNB links. This means that this approach can possibly be used to lower the deployment costs compared to a communication system using (only) CoMP by reducing the requirements for the capacity of the eNB-eNB links.

As described above, various embodiments can be seen to have one or more of the following features:

Introduction of a feed-back between a relay node and its associated base station(s), which carries the information on which communication terminal(s) is/are served by which base station (the relay node has knowledge about available base stations).

A relay node uses a mechanism (including e.g. transportation mechanism/interfaces) to group N streams (for N communication terminals) into 3 super-streams.

For embodiments where base stations have (high capacity) links, a relaying chain adopting a SU-MIMO for the first hop (i.e. transmission from base stations to relay nodes) is used which may allow relay nodes with lower complexity.

A new connection between a communication terminal and the radio access network is managed by a relay node (instead of by the base station).

Sub-bands of variable size are used in the radio cell sectors instead of sub-bands of equal size. The size of these sub-bands can be changed dynamically.

Conflicts (in the sense of overlapping sub-bands in neighbouring clusters, etc.) are iteratively resolved among the base stations with the aim of maximizing an objective function (e.g. related to interference minimization, maximization of throughput, etc.) or of complying with a set of policies While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile communication system comprising:
a plurality of base stations, a relay station associated with the plurality of base stations, and a plurality of mobile stations associated with the plurality of base stations,
wherein, in a first relaying mode, each base station is to transmit data to the relay station, the data to be forwarded to at least one mobile station of the plurality of mobile stations by the relay station using first communication resources,
wherein the first communication resources are identical for all base stations of the plurality of base stations,
wherein, in a second relaying mode, the relay station is to transmit data to the plurality of mobile stations using second communication resources, and
wherein the second communication resources are identical for all mobile stations of the plurality of mobile stations; and
the relay station comprises processor circuitry coupled with memory circuitry, the processor circuitry to execute instructions stored by the memory circuitry to:
determine, for an individual mobile station of the plurality of mobile stations, a distance between the individual mobile station and at least one base station of the plurality of base stations or between the individual mobile station and the relay station;
determine, for the individual mobile station, whether data transmission between the at least one base station and the individual mobile station is to be carried out in the first relaying mode or in the second relaying mode based on the determined distance; and
allocate the first communication resources for the data transmission when the data transmission is to be transmitted according to the first relaying mode or allocate the second communication resources for the data transmission when the data transmission is to be transmitted according to the second relaying mode.

2. The mobile communication system according to claim 1, wherein, in the first relaying mode, the processor circuitry is to execute the instructions to allocate the first communication resources such that the data transmission between the at least one base station and the individual mobile station is relayed via the relay station.

3. The mobile communication system according to claim 1, wherein, in the second relaying mode, the processor circuitry is to execute the instructions to allocate the second communication resources such that the data transmission is transmitted directly between the at least one base station and the individual mobile station.

4. The mobile communication system according to claim 3, wherein, in the second relaying mode, the processor circuitry is to execute the instructions to allocate the second communication resources to the base station when the data transmission is a downlink transmission and allocate the second communication resources to the individual mobile station when the data transmission is an uplink transmission.

5. The mobile communication system according to claim 1, wherein the processor circuitry is to execute the instructions to:
determine that the data transmission between the at least one base station and the individual mobile station is to be carried out in the first relaying mode when the distance between the individual mobile station and the at least one base station is above a first predetermined threshold or when the distance between the individual mobile station and the relay station is below a second predetermined threshold; and
add the individual mobile station to a set of recipients that are served by the relay station.

6. The mobile communication system according to claim 5, wherein, to allocate the first communication resources or the second communication resources, the processor circuitry is to execute the instructions to:
  determine a communication resource allocation, wherein the communication resource allocation is to indicate:
    resources of the first communication resources to be used by the relay station for serving one or more mobile stations of the plurality of mobile stations in the first relaying mode, or
    resources of the second communication resources to be used by the at least one base station for serving one or more mobile stations of the plurality of mobile stations in the second relaying mode; and
  control transmission of the communication resource allocation to the at least one base station.

7. The mobile communication system according to claim 6, wherein, to allocate the first communication resources or the second communication resources, the processor circuitry is to execute the instructions to:
  assign the individual mobile station to an individual super-stream of a plurality of super-streams, wherein a number of super-streams of the plurality of super-streams is based on a number of base stations of the plurality of base stations, and wherein each super-stream of the plurality of super-streams includes data from a base station of the plurality of base stations intended for a subset of mobile stations of the plurality of mobile stations;
  control receipt of the plurality of super-streams as a merged transmission from each base station of the number of base stations over identical communication resources;
  separate the merged transmission into different data portions, each of which correspond to a base station of the number of base stations, wherein an individual data portion of the different data portions corresponds to the at least one base station; and
  separate the data transmission from the individual data portion corresponding to the at least one base station for transmission to the individual mobile station.

8. The mobile communication system according to claim 7, wherein the processor circuitry is to execute the instructions to:
  control transmission of individual data streams from each data portion of the different data portions using identical communication resources, wherein the data transmission is an individual data stream within the individual data portion.

9. The mobile communication system according to claim 8, wherein the processor circuitry is to execute the instructions to:
  control receipt of the plurality of super-streams as a merged transmission during a first time slot; and
  control transmission of the individual data streams from each data portion during a second time slot.

10. The mobile communication system according to claim 1, wherein the processor circuitry is to execute the instructions to:
  determine that the data transmission between the at least one base station and the individual mobile station is to be carried out in the second relaying mode when the distance between the individual mobile station and the at least one base station is below a first predetermined threshold or if the distance between the individual mobile station and the relay station is above a second predetermined threshold; and
  add the individual mobile station to a set of recipients that are served directly by the at least one base station.

11. The mobile communication system according to claim 10, wherein, to allocate the first communication resources or the second communication resources, the processor circuitry is to execute the instructions to:
  allocate the second communication resources in accordance with uncooperative Orthogonal Frequency Division Multiple Access (OFDMA) on a per-slot basis.

12. The mobile communication system according to claim 1, wherein the mobile communication system has a (m,n)-relaying architecture, wherein m is a number of base stations of the plurality of base stations in the mobile communication system and n is a number of relay stations associated with each base station of the plurality of base stations.

13. One or more non-transitory computer readable media (NTCRM) comprising instructions, which when executed by one or more processors of a relay station, is to cause the relay station to:
  determine a distance between a user equipment (UE) of a plurality of UEs in a mobile communication system and an evolved nodeB (eNB) of a plurality of eNBs in the mobile communication system or a distance between the UE and the relay station, wherein the relay station is deployed in the mobile communication system;
  determine whether a data transmission between the eNB and the UE should be transmitted according to a first relaying mode or a second relaying mode based on the determined distance,
  wherein, in the first relaying mode, each eNB of the plurality of eNBs is to transmit data to the relay station to be forwarded to at least one UE of the plurality of UEs by the relay station using first communication resources, wherein the first communication resources are identical for all eNBs of the plurality of eNBs, and
  wherein, in the second relaying mode, the relay station is to transmit data to the plurality of UEs using second communication resources, and wherein the second communication resources are identical for all UEs of the plurality of UEs;
  allocate the first communication resources for the data transmission when the data transmission is to be transmitted according to the first relaying mode or allocate the second communication resources for the data transmission when the data transmission is to be transmitted according to the second relaying mode; and
  forward the data transmission to the UE or the eNB using the first communication resources when the data transmission is to be transmitted according to the first relaying mode, wherein, in the second relaying mode, the data transmission is to be directly transmitted between the UE and the eNB using the second communication resources.

14. The one or more NTCRM of claim 13, wherein execution of the instructions by the one or more processors is to cause the relay station to:
  determine that the data transmission between the eNB and the UE is to be carried out in the first relaying mode when the distance between the UE and the eNB is above a first predetermined threshold or when the distance between the UE and the relay station is below a second predetermined threshold; and
  add the UE to a set of recipients that are served by the relay station when the data transmission is to be carried out according to the first relaying mode.

15. The one or more NTCRM of claim 14, wherein, to allocate the first communication resources or the second communication resources, execution of the instructions by the one or more processors is to cause the relay station to:
- determine a communication resource allocation, wherein the communication resource allocation is to indicate:
  - resources of the first communication resources to be used by the relay station for serving one or more UEs of the plurality of UEs, or
  - resources of the second communication resources to be used by the eNB for serving one or more UEs of the plurality of UEs; and
- control transmission of the communication resource allocation to the eNB.

16. The one or more NTCRM of claim 15, wherein, to allocate the first communication resources or the second communication resources, execution of the instructions by the one or more processors is to cause the relay station to:
- assign the UE to an individual super-stream of a plurality of super-streams, wherein a number of super-streams of the plurality of super-streams is based on a number of eNBs of the plurality of eNBs, and wherein each super-stream of the plurality of super-streams includes data from an eNB of the plurality of eNBs intended for a subset of UEs of the plurality of UEs;
- control receipt of the plurality of super-streams as a merged transmission from each eNB of the number of eNBs over identical communication resources;
- separate the merged transmission into different data portions, each of which correspond to an eNB of the number of eNBs, wherein an individual data portion of the different data portions corresponds to the eNB; and
- separate the data transmission from the individual data portion corresponding to the eNB for transmission to the UE.

17. The one or more NTCRM of claim 16, wherein execution of the instructions the one or more processors is to cause the relay station to:
- control transmission of individual data streams from each data portion of the different data portions using identical communication resources, wherein the data transmission is an individual data stream within the individual data portion.

18. The one or more NTCRM of claim 17, wherein execution of the instructions by the one or more processors is to cause the relay station to:
- control receipt of the plurality of super-streams as a merged transmission during a first time slot; and
- control transmission of the individual data streams from each data portion during a second time slot.

19. The one or more NTCRM of claim 13, wherein execution of the instructions by the one or more processors is to cause the relay station to:
- determine that the data transmission between the eNB and the UE is to be carried out in the second relaying mode when the distance between the UE and the eNB is below a first predetermined threshold or if the distance between the UE and the relay station is above a second predetermined threshold; and
- add the UE to a set of recipients that are served directly by the eNB when the data transmission is to be carried out according to the second relaying mode.

20. The one or more NTCRM of claim 13, wherein the relay station is deployed in a mobile communication system with a (m,n)-relaying architecture, wherein m is a number of eNBs in the mobile communication system, and n is a number of relay stations associated with each eNB in the mobile communication system.

* * * * *